US012676972B2

(12) United States Patent
Zhang et al.

(10) Patent No.: US 12,676,972 B2
(45) Date of Patent: *Jul. 7, 2026

(54) SUB-PARTITIONING IN INTRA CODING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Zhipin Deng, Beijing (CN); Na Zhang, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,108

(22) Filed: Dec. 5, 2023

(65) Prior Publication Data

US 2024/0129466 A1     Apr. 18, 2024

Related U.S. Application Data

(63) Continuation of application No. 17/682,656, filed on Feb. 28, 2022, now Pat. No. 11,924,422, which is a (Continued)

(30) Foreign Application Priority Data

Aug. 30, 2019    (WO) ................ PCT/CN2019/103762

(51) Int. Cl.
H04N 19/119        (2014.01)
H04N 19/105        (2014.01)
(Continued)

(52) U.S. Cl.
CPC ......... *H04N 19/119* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS 8,275,051 B2     9/2012   Hannuksela
9,369,708 B2     6/2016   Zhang
(Continued)

FOREIGN PATENT DOCUMENTS

CN        114303383 B        7/2024
EP          3723368 A1 *  10/2020   ........... H04N 19/105
(Continued)

OTHER PUBLICATIONS

Bross, B. et al., "Versatile Video Coding (Draft 5)", Joint Video Experts Team (JVET) of ITU-T SG16 WP 3 and ISO/IEC JTC 1/SC 29/WG 11, 14' Meeting: Geneva, CH, Mar. 19-27, 2019, Doc. JVET-N1001v1 (Mar. 2019) (Year: 2019).*
(Continued)

*Primary Examiner* — Lindsay J Uhl
(74) *Attorney, Agent, or Firm* — Conley Rose, P.C.

(57)        ABSTRACT

Methods, devices, and systems related to video processing are disclosed. In one example aspect, a method of video processing includes performing a conversion between a block of a current picture of a video and a coded representation of the video using an intra-subblock partitioning (ISP) mode. A prediction is determined for each sub-partition using an intra-prediction process based on samples in the current picture using the ISP mode. The block is partitioned
(Continued)

700 determining, for a conversion between a block of a video and a coded representation of the video, whether a wide-angle intra prediction mode mapping is enabled based on a rule that specifies to use a dimension of a prediction unit for the determining in case that a coding tool is enabled for the conversion of the block — 710 performing the conversion based on the determining — 720 into multiple sub-partitions including a first sub-partitions having a same top-left corner position as a top-left corner position of the block.

20 Claims, 13 Drawing Sheets

Related U.S. Application Data continuation of application No. PCT/CN2020/112425, filed on Aug. 31, 2020.

(51) Int. Cl.

| | |
|---|---|
| *H04N 19/132* | (2014.01) |
| *H04N 19/159* | (2014.01) |
| *H04N 19/176* | (2014.01) |
| *H04N 19/70* | (2014.01) |

(52) U.S. Cl.
CPC ......... *H04N 19/159* (2014.11); *H04N 19/176* (2014.11); *H04N 19/70* (2014.11)

(56) References Cited

U.S. PATENT DOCUMENTS

| | | | | |
|---|---|---|---|---|
| 9,516,306 | B2 | 12/2016 | Zhang | |
| 9,525,861 | B2 | 12/2016 | Zhang | |
| 9,615,090 | B2 | 4/2017 | Zhang | |
| 11,924,422 | B2 * | 3/2024 | Zhang | H04N 19/176 |
| 2012/0189052 | A1 | 7/2012 | Karczewicz | |
| 2013/0016789 | A1 * | 1/2013 | Lou | H04N 19/70 |
| | | | | 375/240.18 |
| 2015/0326880 | A1 | 11/2015 | He | |
| 2018/0014017 | A1 | 1/2018 | Li | |
| 2019/0075328 | A1 | 3/2019 | Huang | |
| 2019/0098305 | A1 * | 3/2019 | Fu | H04N 19/119 |
| 2019/0166370 | A1 | 5/2019 | Xiu | |
| 2020/0413059 | A1 * | 12/2020 | Han | H04N 19/124 |
| 2020/0413072 | A1 * | 12/2020 | Filippov | H04N 19/105 |
| 2021/0218968 | A1 * | 7/2021 | Chernyak | H04N 19/132 |
| 2022/0014741 | A1 | 1/2022 | Xiu | |

FOREIGN PATENT DOCUMENTS

| | | | |
|---|---|---|---|
| JP | 7601991 | B2 | 12/2024 |
| WO | 2019009590 | A1 | 1/2019 |
| WO | 2019154936 | A1 | 8/2019 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, 3—Jul. 12, 2019, document JVET-O2001, 2019. http://phenix.it-sudparis.eu/jvet/doc_end_user/documents/15_Gothenburg/wg11/JVET-O2001-v14.zip. https://vcgit.hhi.fraunhofer.de/jvet/VVCSoftware_VTM/tags/VTM-6.0, May 20, 2022.
Pe-Luxian-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

Jang et al. "CE3-related: Harmonization between WAIP and ISP," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0452, 2019.
De-Luxian-Hernandez et al. "CE8-3.1: Enable Transform Skip in CUs using ISP." Joint Video Experts Team (JVET) of ITU-T SG 16 WP 3 and 1SO/IEC JTC 1/SC 29/WG 11 15th Meeting: Gothenburg, SE, Jul. 3-12, 2019, document JVET-O0097, 2019.
Liu et al. "Non-CE3: Cleanup for ISP Flag and MRL Index Signalling," Joint Video Experts Team (JVET) of ITU-T SG 16 WP 3 and ISO/IEC JTC 1/SC 29/WG 11 15th Meeting: Gothenburg, SE, 3—Jul. 12, 2019, document JVET-O0197, 2019.
Zhao et al. "CE3-Related: Harmonization between ISP and WAIP," Joint Video Experts Team {JVET} of ITU-T SG 16 WP 3 and ISO/IEC JTC 1/SC 29/WG 11 4th Meeting: Geneva, CH, Mar. 19-27, 2019, document JVET-N0427, 2019.
Ramasubramonian et al. "CE3-1.6: On 1xN and 2xN Subblocks of ISP," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0106, 2019.
Racape et al. "CE3-Related: Wide-Angle Intra Prediction for Non-Square Blocks," Joint Video Experts Team (JVET) of ITU-T SG 16 WP 3 and ISO/IEC JTC 1/SC 29/WG 1111th Meeting: Ljubljana, SI, Jul. 10-18, 2018, document JVET-K0500, 2018.
Ma, T, et al., "Non-CE3: Unification on WAIP for normal and ISP intra prediction", Input Document to JVET, Joint Video Experts Team (JVET) of ITU-T SG 16 WP 3 and ISO/IEC JTC 1/SC 29/WG 11, 14th Meeting: Geneva, CH, Mar. 19-27, 2019, Doc. No. JVET-N0339, (Mar. 19, 2019).
JVET-N0339-Tsung-chuan Ma, Xiao-yu Xiu, Yi-Wen Chen, and Xianglin Wang, Non-CE3: Unification on WAIP for normal and ISP intra prediction, Joint Video Experts Team(JVET) of ITU-T SG 16 WP 3 and ISO/IEC JTC 1/SC 29/WG 11, JVET-N0339, 14th Meeting: Geneva, CH, Mar. 2019, pp. 1-4.
International Search Report and Written Opinion from International Patent Application No. PCT/CN2020/112425 dated Dec. 1, 2020 (9 pages).
Non-Final Office Action from U.S. Appl. No. 17/682,656 dated Jun. 7, 2022, 18 pages.
Notice of Allowance from U.S. Appl. No. 17/682,656 dated Oct. 19, 2023, 15 pages.
Final Office Action from U.S. Appl. No. 17/682,656 dated Oct. 3, 2022, 15 pages.
Non-Final Office Action from U.S. Appl. No. 17/682,656 dated Mar. 17, 2023, 16 pages.
Final Office Action from U.S. Appl. No. 17/682,656 dated Jul. 20, 2023, 20 pages.
Document: JVET-I\0452-v2, Heo, J., et al., "CE3-related : Harmonization between WAIP and ISP," Joint Video Experts Team (JVET) of ITU-T SG 16 WP 3 and ISO/IEC JTC 1/SC29/WG 11 14th Meeting: Geneva, CH, Mar. 19-27, 2019, 5 pages.
Japanese Office Action from Japanese Patent Application No. 2023-188074 dated Jul. 9, 2024, 10 pages.
Document: JVET-M0102-v4, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.
Japanese Notice of Allowance from Japanese Patent Application No. 2023-188074 Dated Nov. 5, 2024, 5 pages.
Choi J., et al., "Non-CE3: Simplified Intra Mode Candidates for ISP," Joint Video Experts Team (JVET) of ITU-T SG 16 WP 3 and ISO/IEC JTC 1/SC 29/WG 11, 14th Meeting, Geneva, CH, Mar. 19-27, 2019, Document: JVET-N0230-v3, 09 Pages.

* cited by examiner

400

402 determining, for a conversion between a video unit comprising one or more sub-patitions and a coded representation of the video unit, that the conversion is using an intra-subblock partitioning mode

404 performing the conversion, based on the determining, such that an intra prediction process is used for the conversion of each of the one or more sub-partitions

600

610 performing a conversion between a block of a current picture of a video and a coded representation of the video using an intra-subblock partitioning (ISP) mode, where the block is partitioned into multiple sub-partitions including a first sub-partition having a same top-left corner position as a top-left corner position of the block

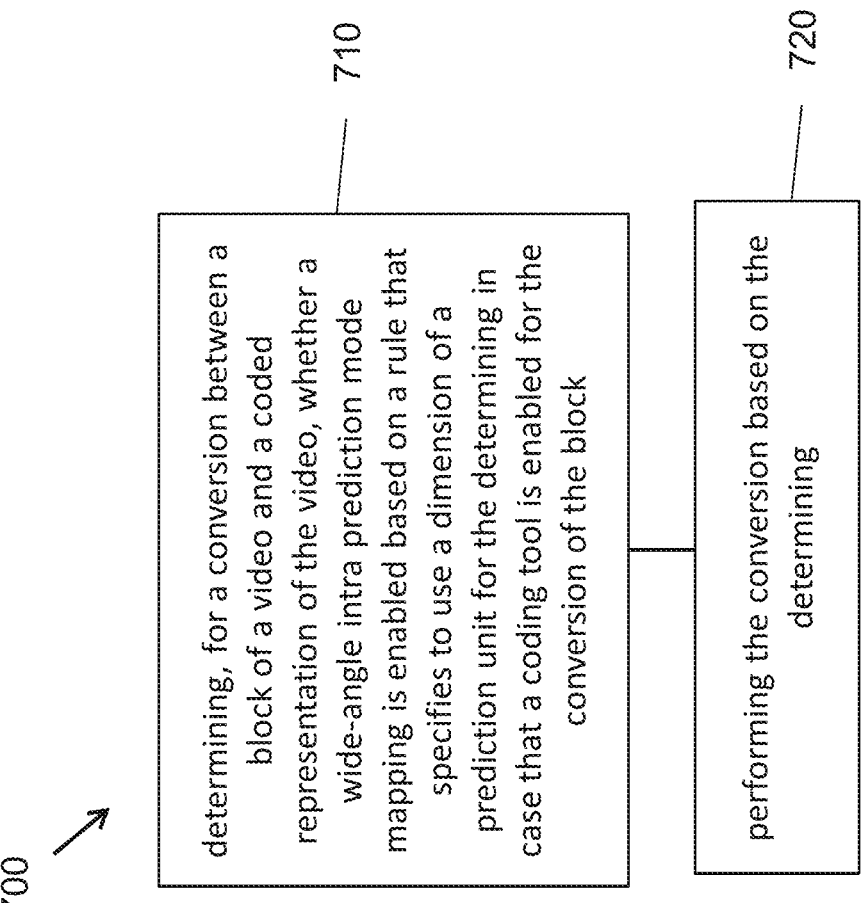

700

710 determining, for a conversion between a block of a video and a coded representation of the video, whether a wide-angle intra prediction mode mapping is enabled based on a rule that specifies to use a dimension of a prediction unit for the determining in case that a coding tool is enabled for the conversion of the block

720 performing the conversion based on the determining

FIG. 7

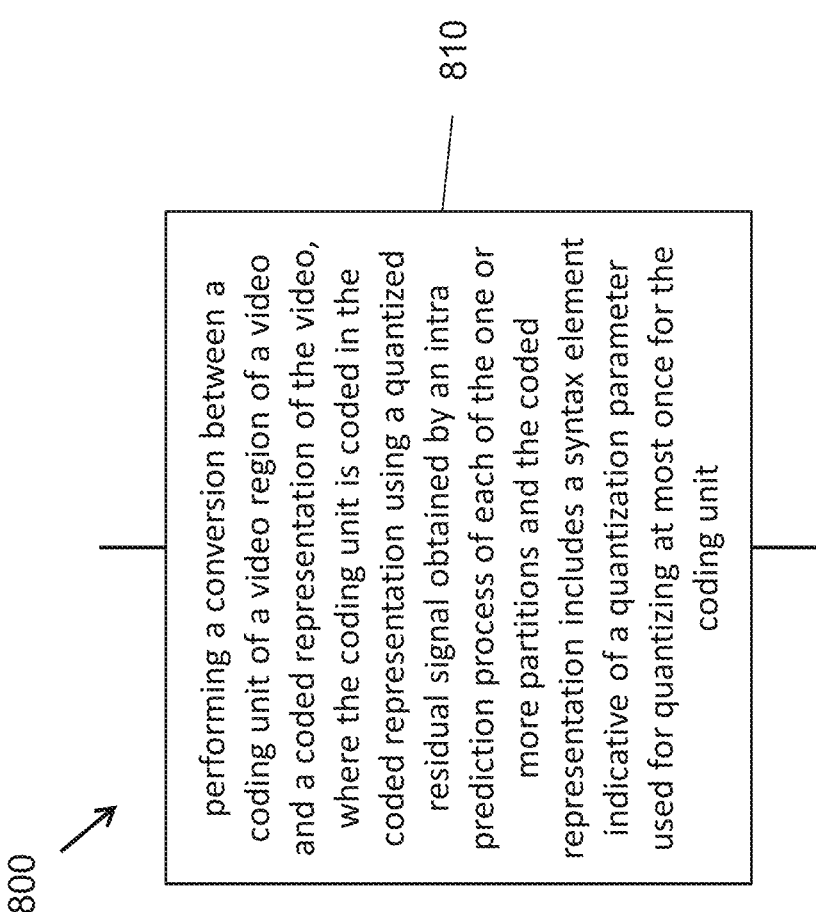

800

810 performing a conversion between a coding unit of a video region of a video and a coded representation of the video, where the coding unit is coded in the coded representation using a quantized residual signal obtained by an intra prediction process of each of the one or more partitions and the coded representation includes a syntax element indicative of a quantization parameter used for quantizing at most once for the coding unit

910 determining, for a conversion between a block of a video that comprises one or more partitions and a coded representation of the video using an intra-subblock partitioning (ISP) mode, whether a transform operation is skipped during encoding or an inverse transform operation is skipped during decoding based on a characteristic of the block or the ISP mode

920 performing the conversion based on the determining

1010 determining, for a conversion between a block of a video that comprises one or more partitions and a coded representation of the video, a type of transform used during the conversion based on whether an intra-subblock partitioning (ISP) mode is used for the conversion

1020 performing the conversion based on the determining

1100

1110 determining, for a conversion between a block of a video that comprises one or more partitions and a coded representation of the video, a restriction for an intra-subblock partitioning (ISP) mode based on whether a lossless coding process is applied to the block

1120 performing the conversion based on the determining

1200

1210 performing a conversion between a coding unit of a video region of a video and a coded representation of the video according to a rule that specifies a relationship between a quantization parameter (QP) for the coding unit and quantization parameters of one or more of the multiple transform units

1300

1310 determining, for a conversion between a video region that comprises one or more coding units and one or more transform units and a coded representation of the video region, whether and/or how to apply a deblocking filter to an edge based on a quantization parameter (QP) of a transform unit related to the edge

1320 performing the conversion based on the determining

SUB-PARTITIONING IN INTRA CODING

CROSS REFERENCE TO RELATED APPLICATIONS

This application is a continuation of U.S. application Ser. No. 17/682,656, filed on Feb. 28, 2022, which is a continuation of International Application No. PCT/CN2020/112425, filed on Aug. 31, 2020, which claims the priority to and benefits of International Patent Application No. PCT/CN2019/103762, filed on Aug. 30, 2019. For all purposes under the law, the entire disclosure of the aforementioned application is incorporated by reference as part of the disclosure of this application.

TECHNICAL FIELD

The present disclosure relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which an intra sub-partitioning mode is used for coding or decoding of video blocks.

In one example aspect, a method of video processing is disclosed. The method includes performing a conversion between a block of a current picture of a video and a coded representation of the video using an intra-subblock partitioning (ISP) mode. A prediction is determined for each sub-partition using an intra-prediction process based on samples in the current picture using the ISP mode. The block is partitioned into multiple sub-partitions including a first sub-partitions having a same top-left corner position as a top-left corner position of the block.

In another example aspect, a method of video processing is disclosed. The method includes determining, for a conversion between a block of a video and a coded representation of the video, whether a wide-angle intra prediction mode mapping is enabled based on a rule. The wide-angle prediction mode is a mode in which a reference sample and a sample to be predicted form an obtuse angle with respect to a top-left direction. The rule specifies to use a dimension of a prediction unit for the determining in case that a coding tool is enabled for the conversion of the block. The method also includes performing the conversion based on the determining.

In another example aspect, a method of video processing is disclosed. The method includes performing a conversion between a coding unit of a video region of a video and a coded representation of the video. The coding unit is partitioned into one or more partitions and the coding unit is coded in the coded representation using a quantized residual signal obtained by an intra prediction process of each of the one or more partitions. The coded representation includes a syntax element indicative of a quantization parameter used for quantizing. The syntax element is included in the coded representation at most once for the coding unit and indicates a difference in value of the quantization parameter and another quantization value based on previously processed coding units of the video.

In another example aspect, a method of video processing is disclosed. The method includes determining, for a conversion between a block of a video that comprises one or more partitions and a coded representation of the video using an intra-subblock partitioning (ISP) mode, whether a transform operation is skipped during encoding or an inverse transform operation is skipped during decoding based on a characteristic of the block or the ISP mode. A prediction is determined for each sub-partition using an intra-prediction process based on samples in a current picture using the ISP mode. The method also includes performing the conversion based on the determining.

In another example aspect, a method of video processing is disclosed. The method includes determining, for a conversion between a block of a video that comprises one or more partitions and a coded representation of the video, a type of transform used during the conversion based on whether an intra-subblock partitioning (ISP) mode is used for the conversion. A prediction is determined for each sub-partition using an intra-prediction process based on samples in a current picture using the ISP mode. The conversion comprises applying a transform prior to encoding in the coded representation during encoding or applying an inverse transform of the transform to parsed coefficient values from the coded representation prior to reconstructing sample values of the block. The method also includes performing the conversion based on the determining.

In another example aspect, a method of video processing is disclosed. The method includes determining, for a conversion between a block of a video that comprises one or more partitions and a coded representation of the video, a restriction for an intra-subblock partitioning (ISP) mode based on whether a lossless coding process is applied to the block. A prediction is determined for each sub-partition using an intra-prediction process based on samples in a current picture using the ISP mode. The method also includes performing the conversion based on the determining.

In another example aspect, a method of video processing is disclosed. The method includes performing a conversion between a coding unit of a video region of a video and a coded representation of the video according to a rule. The coding unit is divided into multiple transform units. The rule specifies a relationship between a quantization parameter (QP) for the coding unit and quantization parameters of one or more of the multiple transform units.

In another example aspect, a method of video processing is disclosed. The method includes determining, for a conversion between a video region and a coded representation of the video region, whether and/or how to apply a deblocking filter to an edge based on a quantization parameter (QP) of a transform unit related to the edge. The video region comprises one or more coding units and one or more transform units. The method also includes performing the conversion based on the determining.

In another example aspect, a method of video processing is disclosed. The method includes determining, for a conversion between a video unit comprising one or more sub-partitions and a coded representation of the video unit, that the conversion is using an intra-subblock partitioning mode; and performing the conversion, based on the determining, such that an intra prediction process is used for the conversion of each of the one or more sub-partitions.

In another example aspect, another method of video processing is disclosed. The method includes determining, based on an applicability of a coding tool and/or a size of a prediction unit of a video block and without using a coding unit size of the video block, whether a wide-angle intra prediction mapping is to be used during a conversion between the video block and a coded representation of the video block; and performing the conversion based on an outcome of the determining.

In another example aspect, another method of video processing is disclosed. The method includes determining, for a conversion between a video region comprising a coding unit, wherein the coding unit comprises intra sub-block partitions, a delta quantization parameter (delta QP) that is applicable to the conversion of all intra sub-block partitions of the coding unit and a coded representation of the video region; and performing the conversion using the delta QP; wherein the delta QP is signaled for the coding unit in the coded representation.

In another example aspect, another method of video processing is disclosed. The method includes determining, for a conversion between a video region and a coded representation of the video region, a quantization parameter (QP) used for the conversion of a coding unit (CU) in the video region based on a QP of a transform unit (TU) in the video region; and performing the conversion using the QP of the TU and/or the QP of the CU.

In another example aspect, another method of video processing is disclosed. The method includes determining, for a conversion between a video region comprising one or more coding units and one or more transform units, about whether to apply a deblocking filter to an edge a video block for the conversion based on a transform unit to which the edge belongs; and performing the conversion based on the determining.

In another example aspect, another method of video processing is disclosed. The method includes determining, for a conversion between a video block and a coded representation of the video block using an intra sub-partitioning mode, whether a transform operation is skipped based on a dimension of a coding block or a prediction block or a transform block; and performing the conversion based on the determining.

In another example aspect, another method of video processing is disclosed. The method includes determining, for a conversion between a video block and a coded representation of the video block, a type of transform to be applied based on whether an intra sub-partitioning mode or a lossless coding mode is used for the conversion; and performing the conversion based on the determining.

In another example aspect, another method of video processing is disclosed. The method includes performing a conversion between a video block and a coded representation of the video block on a rule of exclusivity due to which either a lossless coding mode is used for the conversion or an intra sub-partitioning mode is used for the conversion, wherein the coded representation includes an indication that either the lossless coding mode is used or the intra sub-partitioning mode is used.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 7 is a flowchart representation of another method for video processing in accordance with the present technology.

FIG. 8 is a flowchart representation of another method for video processing in accordance with the present technology.

FIG. 9 is a flowchart representation of another method for video processing in accordance with the present technology.

DETAILED DESCRIPTION

This disclosure is related to video coding technologies. Specifically, it is related to intra sub-partitioning prediction in video coding. It may be applied to the existing video/image coding standard like HEVC, or the standard Versatile Video Coding (VVC) to be finalized. It may be also applicable to future video coding standards or video codec.

Embodiments of the disclosed technology may be applied to existing video coding standards (e.g., HEVC, H.265) and future standards to improve compression performance. Section headings are used in the present disclosure to improve readability of the description and do not in any way limit the discussion or the embodiments (and/or implementations) to the respective sections only.

1. Initial Discussion

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC1) SC29/WG11 (MPEG) was created to work on the VVC standard targeting at 50% bitrate reduction compared to HEVC.

1.1 Example Embodiment of Intra Sub-Partition (ISP)

Figure 1:
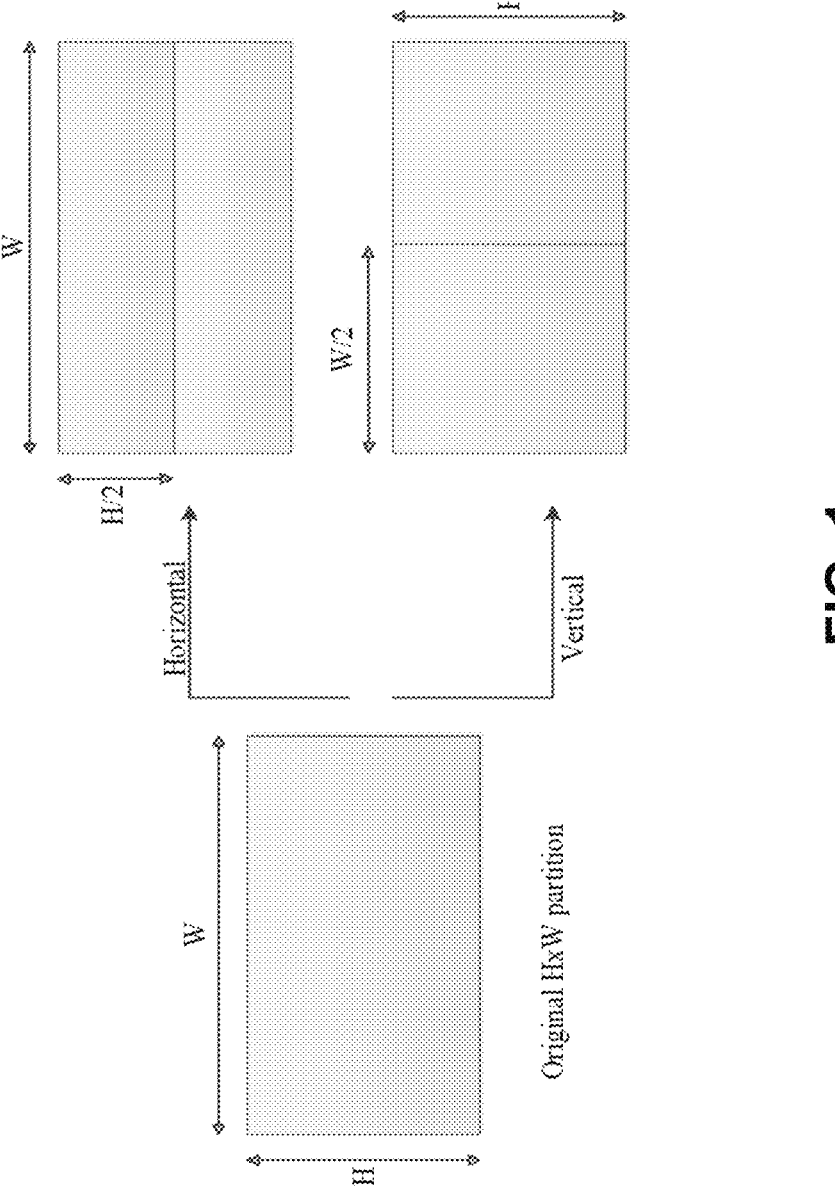
FIG. 1 is a block diagram showing an example of intra sub-partitioning.
Figure 2:
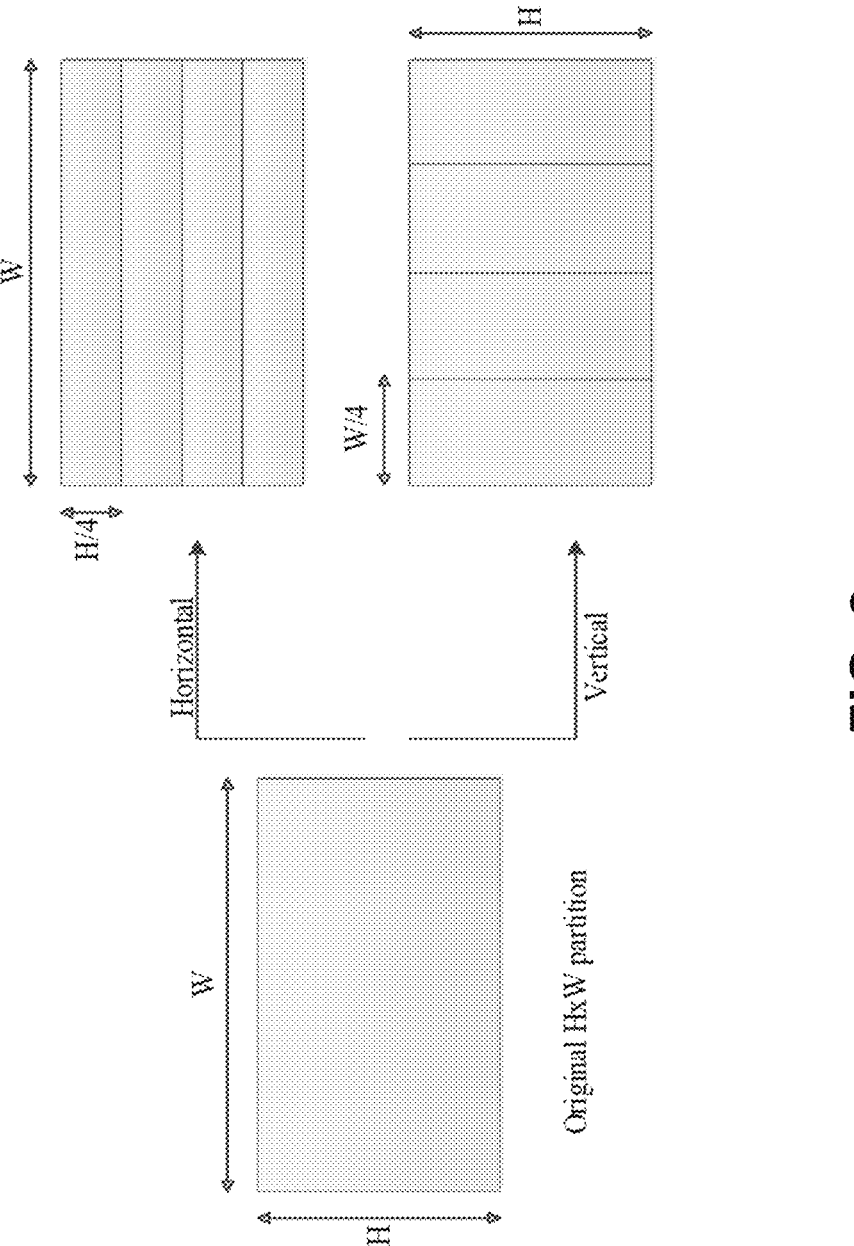
FIG. 2 is a block diagram showing an example of intra sub-partitioning

In some embodiments, the ISP tool divides luma intra-predicted blocks vertically or horizontally into 2 or 4 sub-partitions depending on the block size dimensions, as shown in Table 1. FIG. 1 and FIG. 2 show examples of the two possibilities. FIG. 1 shows an example of division of 4×8 and 8×4 blocks. FIG. 2 shows an example of division of all blocks except 4×8, 8×4 and 4×4. All sub-partitions fulfill the condition of having at least 16 samples.

TABLE 1

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

Example ISP related syntax, semantics, and process are presented as below:

| | Descriptor |
|---|---|
| coding_unit( x0, y0, cbWidth, cbHeight, cqtDepth, treeType, modeType ) { | |
|     chType = treeType = = DUAL_TREE_CHROMA? 1 : 0 | |
|     if( slice_type != ]I \| \| sps_ibc_enabled_flag \| \| sps_palette_enabled_flag) { | |
|     if( treeType != DUEL_TREE_CHROMA && | |
|     !( ( ( cbWidth = = 4 && cbHeight = 4 ) \| \| modeType = = | |
| MODE_TYPE_INTRA ) | |
|     && !sps_ibc_enables_flag ) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) && modeType = = | |
| MODE_TYPE_ALL ) | |
|       pred_mode_flag | ae(v) |
|     if( ( ( slice_type = = I && cu_skip_slag[ x0 ][ y0 ] = =0 ) \| \| | |
|     ( slice_type != I && ( CuPredMode[ chType ][ x0 ][ y0 ] != | |
| MODE_INTRA \| \| | |
|     ( cbWidth = = 4 && cbHeight = = 4 && cu_skip_slag[ x0 ][ y0 ] = = | |
| 0 ) ) ) ) && | |
|     cbWidth <= 64 && cbHeight <= 64 && modeType != | |
| MODE_TYPE_INTER && | |
|     sps_ibc_enabled_flag && treeType != DUAL_TREE_CHROMA ) | |
|       pred_mode_ibc_flag | ae(v) |
|     if( ( ( ( slice_type = = I \| \| ( cbWidth = = 4 && cbHeight = = 4 \| \| | |
| sps_ibc_enabled_flag ) && | |
|     CuPredMode[ x0 ][ y0 ] = = MODE_INTRA ) \| \| | |
|     ( slice_type != I && !( cbWidth = = 4 && cbHeighty = = 4 ) && | |
| !sps_ibc_enabled_flag | |
|     && CuPredMode[ x0 ][ y0 ] != MODE_INTRA ) ) && | |
| sps_palette_enabled_flag && | |
|     cbWidth <= 64 && cbHeight <= 64 && && cu_skip_flag[ x0 ][ y0 ] = = | |
| 0 && | |
|     modeType != MODE_INTER ) | |

```
        pred_mode_plt_flag                                                              ae(v)
    }
    if( CuPredMode[ chType ][ x0 ][ y0 ] = = MODE_INTRA | |
        CuPredMode[ chType ][ x0 ][ y0 ] = = MODE_PLT ) {
        if( treeType = = SINGLE_TREE | | treeType = = DUAL_TREE_LUMA ) {
            if( pred_mode_plt_flag ) {
                if( treeType = = DUAL_TREE_LUMA )
                    palette_coding( x0, y0, cbWidth, cbHeight, 0, 1 )
                else /* SINGLE_TREE */
                    palette_coding( x0, y0, cbWidth, cbHeight, 0, 3 )
            } else {
                if( sps_bdpcm_enabled_flag &&
                    cbWidth <= MaxTsSize && cbHeight <= MaxTsSize )
                    intra_bdpcm_flag                                                      ae(v)
                if( intra_bdpcm_flag )
                    intra_bdpcm_dir_flag                                                  ae(v)
                else {
            if( sps_mip_enabled_flag &&
        ( Abs( Log2(cbWidth) − Log2( cbHeight ) ) <= 2 ) &&
                cbWidth <= MaxTbSizeY && cbHeight <=
    MaxTbSize Y )
                    intra_mip_flag[ x0 ][ y0 ]                                            ae(v)
                if( intra_mip_flag[ x0 ][ y0 ] )
                    intra_mip_mode[ x0 ][ y0 ]                                            ae(v)
                else {
                    if( sps_mrl_enabled_flag &&
        ( ( y0 % CtbSizeY ) > 0 ) )
                            intra_luma_ref_idx[ x0 ][ y0 ]                                ae(v)
                        {{ if ( sps_isp_enabled_flag &&
    intra_luma_ref_idx[ x0 ][ y0 ] = = 0 &&
                            ( cbWidth <= MaxTbSize Y &&
    cbHeight <= MaxTbSizeY ) &&
                            ( cbWidth * cbHeight >
    MinTbSizeY * MinTbSizeY ) ) }}
                        {{ intra_subpartitions_mode_flag[ x0 ][ y0 ] }}              {{ ae(v) }}
                        {{ if( intra_subpartitions_mode_flag[ x0 ][ y0 ] = = 1 ) }}
                            {{ intra_subpartitions_split_flag[ x0 ][ y0 ] }}
                            {{ if( intra_luma_ref_idx[ x0 ][ y0 ] = = 0 )
                                intra_luma_mpm_flag[ x0 ][ y0 ]                           ae(v)
                            if( intra_luma_mpm_flag[ x0 ][ y0 ] ) {
                                if( intra_luma_ref_idx[ x0 ][ y0 ] = = 0 )
            intra_luma_not_planar_flag[ x0 ][ y0 ]                                        ae(v)
                                if( intra_luma_not_planar_flag[ x0 ][ y0 ] )
            intra_luma_mpm_idx[ x0 ][ y0 ]                                                ae(v)
                            } else
            intra_luma_mpm_remainder[ x0 ][ y0 ]                                          ae(v)
                        }
                    }
                }
            }
        }
    ...
    if( cu_cbf ) {
        if( CuPredMode[ chType ][ x0 ][ y0 ] = = MODE_INTER &&
    sps_sbt_enabled_flag
            && !ciip_flag[ x0 ][ y0 ] && !MergeTriangleFlag[ x0 ][ y0 ] ) {
            if( cbWidth <= MaxSbtSize && cbHeight <= MaxSbtSize ) {
                allowSbtVerH = cbWidth >= 8
                allowSbtVerQ = cbWidth >= 16
                allowSbtHorH = cbHeight >= 8
                allowSbtHorQ = cbHeight >= 16
                if( allowSbtVerH | | allowSbtHorH | | allowSbtVerQ | |
    allowSbtHorQ )
                    cu_sbt_flag                                                          ae(v)
            }
            if( cu_sbt_flag ) {
                if( ( allowSbtVerH | | allowSbtHorH ) && ( allowSbtVerQ | |
    allowSbtHorQ) )
                    cu_sbt_quad_flag                                                     ae(v)
                if( ( cu_sbt_quad_flag && allowSbtVerQ && allowSbtHorQ ) | |
                    ( !cu_sbt_quad_flag && allowSbtVerH &&
    allowSbtHorH ) )
                    cu_sbt_horizontal_flag                                               ae(v)
                    cu_sbt_pos_flag                                                      ae(v)
            }
        }
        LfnstDcOnly = 1
        LfnstZeroOutSigCoeffFlag = 1
        transform_tree( x0, y0, cbWidth, cbHeight, treeType )
        lfnstWidth = ( tree Type = = DUAL TREE_CHROMA ) ?
```

-continued

```
cbWidth / SubWidthC
                                    : cbWidth
        lfnstHeight = ( treeType = = DUAL_TREE_CHROMA ) ?
cbHeight / SubHeightC
                                    : cbHeight
        if( Min( lfnstWidth, lfnstHeight ) >= 4 && sps_lfnst_enabled_flag = = 1 &&
              CuPredMode[ chType ][ x0 ][ y0 ] MODE_INTRA &&
              {{ IntraSubPartitionsSplitType = = ISP_NO_SPLIT }} &&
              ( !intra_mip_flag[ x0 ][ y0 ] | | Min( lfnstWidth, lfnstHeight ) >= 16 ) &&
              tu_mts_idx[ x0 ][ y0] = = 0 && Max( cbWidth, cbHeight ) <=
MaxTbSize Y) {
              if( LfnstDcOnly = = 0 && LfnstZeroOutSigCoeffFlag = = 1 )
                    lfnst_idx[ x0 ][ y0 ]                                    ae(v)
              }
        }
```

| | Descriptor |
|---|---|

```
transform_tree( x0, y0, tbWidth, tbHeight , treeType, chType ) {
            InferTuCbfLuma = 1
            if( IntraSubPartitionsSplitType = = ISP_NO_SPLIT && !cu_sbt_flag ) {
                if( tbWidth > MaxTbSizeY | | tbHeight > MaxTbSizeY ) {
                    verSplitFirst = ( tbWidth > MaxTbSizeY && tbWidth > tbHeight ) ? 1 : 0
                    trafoWidth = verSplitFirst ? (tbWidth / 2) : tbWidth
                    trafoHeight = !verSplitFirst ? (tbHeight / 2) : tbHeight
                    transform_tree( x0, y0, trafoWidth, trafoHeight, chType )
                    if( verSplitFirst )
            transform_tree( x0 + trafoWidth, y0, trafoWidth, trafoHeight, treeType, chType )
                    else
            transform_tree( x0, y0 + trafoHeight, trafoWidth, trafoHeight, treeType, chType )
                } else {
                        transform_unit( x0, y0, tbWidth, tbHeight, treeType, 0, chType )
                }
            } else if( cu_sbt_flag ) {
                if( !cu_sbt_horizontal_flag ) {
                        trafoWidth = tbWidth * SbtNumFourthsTb0 / 4
                        transform_unit( x0, y0, trafoWidth, tbHeight, treeType , 0, 0 )
                transform_unit( x0 + trafoWidth, y0, tbWidth – trafoWidth, tbHeight, treeType, 1, 0
)
                } else {
                        trafoHeight = tbHeight * SbtNumFourthsTb0 / 4
                        transform_unit( x0, y0, tbWidth, trafoHeight, treeType , 0, 0 )
                transform_unit( x0, y0 + trafoHeight, tbWidth, tbHeight – trafoHeight, treeType, 1, 0
)
                }
            {{ } else if( IntraSubPartitionsSplitType = = ISP_HOR_SPLIT ) { }}
                {{ trafoHeight = tbHeight / NumIntraSubPartitions }}
                {{ for( partIdx = 0; partIdx < NumIntraSubPartitions; partIdx++ ) }}
                {{ transform_unit( x0, y0 + trafoHeight * partIdx, tbWidth, trafoHeight, treeType,
partIdx, 0 ) }}
                {{ } else if( IntraSubPartitionsSplitType = = ISP_VER_SPLIT ) { }}
                {{ trafoWidth = tbWidth / NumIntraSubPartitions }}
                {{ for( partIdx = 0; partIdx < NumIntraSubPartitions; partIdx++ ) }}
                {{ transform_unit( x0 + trafoWidth * partIdx, y0, trafoWidth, tbHeight, treeType,
partIdx, 0 ) }}
            }
}
```

| | Descriptor |
|---|---|

```
transform_unit( x0, y0, tbWidth, tbHeight, treeType, subTuIndex, chType ) {
            if( ( treeType = = SINGLE_TREE | | treeType = = DUAL_TREE_CHROMA ) &&
                    ChromaArrayType != 0 ) {
            if( ( {{ IntraSubPartitionsSplitType = = ISP_NO_SPLIT }} && !( cu_sbt_flag &&
                    ( ( subTuIndex = = 0 && cu_sbt_pos_flag ) = | |
                      ( subTuIndex = = 1 && !cu_sbt_pos_flag ) ) ) ) | |
                    {{ ( IntraSubPartitionsSplitType != ISP_NO_SPLIT &&
                    ( subTuIndex = = NumIntraSubPartitions – 1) }}) ) {
                    tu_cbf_cb[ x0 ][ y0 ]                                    ae(v)
                    tu_cbf_cr[ x0 ][ y0 ]                                    ae(v)
            }
            }
            if( treeType = = SINGLE_TREE | | treeType = = DUAL_TREE_LUMA ) {
                if( ({{ IntraSubPartitionsSplitType = = ISP_NO_SPLIT && }} !( cu_sbt_flag &&
                    ( ( subTuIndex = = 0 && cu_sbt_pos_flag ) | |
                      ( subTuIndex = = 1 && !cu_sbt_pos_flag ) ) )&&
                    ( CuPredMode[ chType ][ x0 ][ y0 ] = = MODE_INTRA | |
                        tu_cbf_cb[ x0 ][ y0 ] | | tu_cbf_cr[ x0 ][ y0 ] | |
                        CbWidth[ chType ][ x0 ][ y0 ] > MaxTbSize Y | |
                        CbHeight[ chType ][ x0 ][ y0 ] > MaxTbSizeY ) ) | |
```

-continued

```
                ( {{ IntraSubPartitionsSplitType != ISP_NO_SPLIT &&
                ( subTuIndex < NumIntraSubPartitions − 1 | | !InferTuCbfLuma ) ) ) }}
                tu_cbf_luma[ x0 ][ y0 ]                                              ae(v)
        {{if (IntraSubPartitionsSplitType != ISP_NO_SPLIT )
                {{InferTuCbfLuma = InferTuCbfLuma && !tu_cbf_luma[ x0 ][ y0 ] }}
    }
    {{if( IntraSubPartitionsSplitType != ISP_NO_SPLIT &&
        {{treeType = = SINGLE_TREE && subTuIndex = = NumIntraSubPartitions − 1 ) ) }}
        xC = CbPosX[ chType ][ x0 ][ y0 ]
        yC = CbPosY[ chType ][ x0 ][ y0 ]
        wC = CbWidth[ chType ][ x0 ][ y0 ] / SubWidthC
        hC = CbHeight[ chType ][ x0 ][ y0 ] / SubHeightC
    } else
        xC = x0
        yC = y0
        wC = tbWidth / SubWidthC
        hC = tbHeight / SubHeightC
    }
        {{if( ( CbWidth[ chType ][ x0 ][ y0 ] > 64 | | CbHeight[ chType ][ x0 ][ y0 ] > 64 | |
            tu_cbf_luma[ x0 ][ y0 ] | | tu_cbf_cb[ x0 ][ y0 ] | | tu_cbf_cr[ x0 ][ y0 ] ) &&
        treeType != DUAL_TREE_CHROMA ) { }}
            {{if( cu_qp_delta_enabled_flag && !IsCuQpDeltaCoded ) { }}
                    {{cu_qp_delta_abs}}                                             ae(v)
                    {{if( cu_qp_delta_abs ) }}
                            {{cu_qp_delta_sign_flag}}                               ae(v)
            {{ }}}
        {{ }}}
        if( ( tu_cbf_cb[ x0 ][ y0 ] | | tu_cbf_cr[ x0 ][ y0 ] ) {
            if( cu_chroma_qp_offset_enabled_flag && !IsCuChromaQpOffsetCoded) {
                    cu_chroma_qp_offset_flag                                        ae(v)
                    if( cu_chroma_qp_offset_flag && chroma_qp_offset_list_len_minus]1 > 0 )
                            cu_chroma_qp_offset_idx                                 ae(v)
            }
        }
        if( sps_joint_cbcr_enabled_flag && ( ( CuPredMode[ chType ][ x0 ][ y0 ] = =
MODE_INTRA
                && ( tu_cbf_cb[ x0 ][ y0 ] = tu_cbf_cr[ x0 ][ y0 ] ) ) | |
            ( tu_cbf_cb[ x0 ][ y0 ] && tu_cbf_cr[ x0 ][ y0 ] ) ) )
            tu_joint_cbcr_residual_flag[ x0 ][ y0 ]                                 ae(v)
        {{ if( tu_cbf_luma[ x0 ][ y0 ] && treeType != DUAL_TREE_CHROMA
        && ( tbWidth <= 32 ) && ( tbHeight <= 32 )
        && ( IntraSubPartitionsSplit[ x0 ][ y0 ] = = ISP_NO_SPLIT )
&& ( !cu_sbt_flag ) ) }} {
        if( sps_transform_skip_enabled_flag && !BdpcmFlag[ x0 ][ y0 ] &&
                tbWidth <= MaxTsSize && tbHeight <= MaxTsSize )
                transform_skip_flag[ x0 ][ y0 ]                                     ae(v)
            if( ( ( CuPredMode[ chType ][ x0 ][ y0 ] = = MODE_INTER &&
                sps_explicit_mts_inter_enabled_flag )
                | | ( CuPredMode[ chType ][ x0 ][ y0 ] = = MODE_INTRA &&
                sps_explicit_mts_intra_enabled_flag ) ) &&
( !transform_skip_flag[ x0 ][ y0 ] ) )
                tu_mts_idx[ x0 ][ y0 ]                                              ae(v)
        }
        if( tu_cbf_luma[ x0 ][ y0 ] ) {
            if( !transform_skip_flag[ x0 ][ y0 ] )
                residual_coding( x0, y0, Log2( tbWidth ), Log2( tbHeight ), 0 )
            else
                residual_ts_coding( x0, y0, Log2( tbWidth ), Log2( tbHeight ), 0 )
        }
        if( tu_cbf_cb[ x0 ][ y0 ] )
            residual_coding( xC, yC, Log2( wC ), Log2( hC ), 1 )
        if( tu_cbf_cr[ x0 ][ y0 ] &&
            !( tu_cbf_cb[ x0 ][ y0 ] && tu_joint_cbcr_residual_flag[ x0 ][ y0 ] ) ) {
            residual_coding( xC, yC, Log2( wC ), Log2( hC ), 2 )
        }
}
```

|  | Descriptor |
|---|---|

```
residual_coding( x0, y0, log2TbWidth, log2TbHeight, cIdx ) {
        if( ( tu_mts_idx[ x0 ][ y0 ] > 0 | |
        ( cu_sbt_flag && log2TbWidth < 6 && log2TbHeight < 6 ) )
        && cIdx == 0 && log2TbWidth > 4 )
    log2ZoTbWidth = 4
    else
        log2ZoTbWidth = Min( log2TbWidth, 5 )
    MaxCcbs = 2 * ( 1 << log2TbWidth ) * ( 1 << log2TbHeight )
    if( tu_mts_idx[ x0 ][ y0 ] > 0 | |
        ( cu_sbt_flag && log2TbWidth < 6 && log2TbHeight <6 ) )
```

-continued

```
            && cIdx = = 0 && log2TbHeight > 4 )
        log2ZoTbHeight = 4
    else
        log2ZoTbHeight = Min( log2TbHeight, 5 )
    if( log2TbWidth > 0 )
        last_sig_coeff_x_prefix                                                    ae(v)
    if( log2TbHeight > 0 )
        last_sig_coeff_y_prefix                                                    ae(v)
    if( last_sig_coeff_x_prefix > 3 )
        last_sig_coeff_x_suffix                                                    ae(v)
    if( last_sig_coeff_y_prefix > 3 )
        last_sig_coeff_y_suffix                                                    ae(v)
    log2TbWidth = log2ZoTbWidth
    log2TbHeight = log2ZoTbHeight
    remBinsPass1 = ( ( 1 << ( log2TbWidth + log2TbHeight ) ) * 7 ) >> 2
    log2SbW = ( Min( log2TbWidth, log2TbHeight ) <2 ? 1 : 2 )
    log2SbH = log2SbW
    if( log2TbWidth + log2TbHeight > 3 ) {
        if( log2TbWidth < 2 ) {
            log2SbW = log2TbWidth
            log2SbH = 4 − log2SbW
        } else if( log2TbHeight < 2 ) {
            log2SbH = log2TbHeight
            log2SbW = 4 − log2SbH
        }
    }
    numSbCoeff = 1 << ( log2SbW + log2SbH )
    lastScanPos = numSbCoeff
    lastSubBlock = ( 1 << ( log2TbWidth + log2TbHeight − ( log2SbW + log2SbH) ) ) − 1
    do {
        if( lastScanPos = = 0 ) {
            lastScanPos = numSbCoeff
            lastSubBlock− −
        }
        lastScanPos− −
        xS = DiagScanOrder[ log2TbWidth − log2SbW ][ log2TbHeight − log2SbH ]
                                                     [ lastSubBlock ][ 0 ]
        yS = DiagScanOrder[ log2TbWidth − log2SbW ][ log2TbHeight − log2SbH ]
                                                     [ lastSubBlock ][ 1 ]
        xC = ( xS << log2SbW ) +
DiagScanOrder[ log2SbW ][ log2SbH ][ lastScanPos ][ 0 ]
        yC = ( yS << log2SbH ) +
DiagScanOrder[ log2SbW ][ log2SbH ][ lastScanPos ][ 1 ]
    } while( (xC != LastSignificantCoeffX ) | | (yC != LastSignificantCoeffY ) )
    if( lastSubBlock = = 0 && log2TbWidth >= 2 && log2TbHeight >= 2 &&
        !transform_skip_flag[ x0 ][ y0 ] && lastScanPos > 0 )
        LfnstDcOnly = 0
    if( ( lastSubBlock > 0 && log2TbWidth >= 2 && log2TbHeight >= 2 ) | |
        ( lastScanPos > 7 && ( log2TbWidth = = 2 | | log2TbWidth = = 3 ) &&
        log2TbWidth = = log2TbHeight ) )
        LfnstZeroOutSigCoeffFlag = 0
    QState = 0
    for( i = lastSubBlock; i >= 0; i − − ) {
        startQStateSb = QState
        xS = DiagScanOrder[ log2TbWidth − log2SbW ][ log2TbHeight − log2SbH ]
                                             [ i ][ 0 ]
        yS = DiagScanOrder[ log2TbWidth − log2SbW ][ log2TbHeight − log2SbH ]
                                             [ i ][ 1 ]
        inferSbDcSigCoeffFlag = 0
        if( ( i < lastSubBlock ) && ( i > 0 ) ) {
            coded_sub_block_flag[ xS ][ yS ]                                        ae(v)
            inferSbDcSigCoeffFlag = 1
        }
        firstSigScanPosSb = numSbCoeff
        lastSigScanPosSb = − 1
        firstPosMode0 = ( i = = lastSubBlock ? lastScanPos : numSbCoeff − 1 )
        firstPosMode1 = −1
        for( n = firstPosMode0; n >= 0 && remBinsPass1 >= 4; n − − ) {
            xC = ( xS << log2SbW ) +
DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( coded_sub_block_flag[ xS ][ yS ] && ( n > 0 = | |
!inferSbDcSigCoeffFlag ) &&
                ( xC != LastSignificantCoeffX | | yC != Last SignificantCoeffY ) ) {
```

-continued

```
                sig_coeff_flag[ xC ][ yC ]                                    ae(v)
                remBinsPass1 – –
                if( sig_coeff_flag[ xC ][ yC ] )
                        inferSbDcSigCoeffFlag = 0
        }
        if( sig_coeff_flag[ xC ][ yC ] ) {
                abs_level_gtx_flag[ n ][ 0 ]                                  ae(v)
                remBinsPass1 – –
        if( abs_level_gtx_flag[ n ][ 0 ] ) {
                par_level_flag[ n ]                                           ae(v)
                remBinsPass1 – –
                abs_level_gtx_flag[ n ][ 1 ]                                  ae(v)
                remBinsPass1 – –
        }
        if( lastSigScanPosSb = = –1 )
                lastSigScanPosSb = n
        firstSigScanPosSb = n
        }
        AbsLevelPass1 [ xC ][ yC ] = sig_coeff_flag[ xC ][ yC ] +
par_level_flag[ n ] +
        abs_level_gtx_flag[ n ][ 0 ] + 2 * abs_level_gtx_flag[ n ][ 1 ]
                if( dep_quant_enabled_flag )
                        QState =
QStateTransTable[ QState ][ AbsLevelPass1 [ xC ][ yC ] & 1 ]
                if( remBinsPass1 < 4 )
                        firstPosModel = n – 1
        }
        for( n = numSbCoeff – 1; n >= firstPosModel; n– – ) {
                xC = ( xS << log2SbW +
DiagScanOrder[ log2SbW ][ log2SbH ][ n ][ 0 ]
                yC = ( yS << log2SbH ) + DiagScanOrder[ log2SbW ][ log2SbH ][ n ][ 1 ]
                if( abs_level_gtx_flag[ n ][ 1 ] )
                        abs_remainder[ n ]                                   ae(v)
                AbsLevel[ xC ][ yC ] AbsLevelPass1 [ xC ][ yC ] +2 *
abs_remainder[ n ]
        }
        for( n = firstPosModel; n >= 0; n– – ) {
                xC = ( xS << log2SbW ) +
DiagScanOrder[ log2SbW ][ log2SbH ][ n ][ 0 ]
                yC = ( yS << log2SbH ) + DiagScanOrder[ log2SbW ][ log2SbH ][ n ][ 1 ]
                dec_abs_level[ n ]                                           ae(v)
                if(AbsLevel[ xC ][ yC ] > 0 )
                        firstSigScanPosSb = n
                        if( dep_quant_enabled_flag )
                                QState =
QState TransTable[ QState ][ AbsLevel[ xC ][ yC ] & 1 ]
        }
        if( dep_quant_enabled_flag | | !sign_data_hiding_enabled_flag )
                signHidden = 0
        else
                signHidden = ( lastSigScanPosSb – firstSigScanPosSb > 3 ? 1 : 0 )
        for( n = numSbCoeff – 1; n >= 0; n – – ) {
                xC = ( xS << log2SbW +
DiagScanOrder[ log2SbW ][ log2SbH ][ n ][ 0 ]
                yC = ( yS << log2SbH ) + DiagScanOrder[ log2SbW ][ log2SbH ]
[ n ][ 1 ]
                if( ( AbsLevel[ xC ][ yC ] > 0 ) &&
                ( !signHidden | | ( n != firstSigScanPosSb ) ) )
                        coeff_sign_flag[ n ]                                 ae(v)
        }
        if( dep_quant_enabled_flag ) {
                QState = startQStateSb
                for( n = numSbCoeff – 1; n >= 0; n – – ) {
                        xC = xS << log2SbW ) +
DiagScanOrder[ log2SbW ][ log2SbH ][ n ][ 0 ]
                        yC = ( yS << log2SbH ) +
DiagScanOrder[ log2SbW ][ log2SbH ][ n ][ 1 ]
                        if( AbsLevel[ xC ][ yC ] > 0 )
                                TransCoeffLevel[ x0 ][ y0 ][ cIdx ][ xC ][ yC ] =
                                        (2 * AbsLevel[ xC ][ yC ] – (QState >
1 ? 1 0 ) ) *
                                        ( 1 – 2 * coeff_sign_flag[ n ] )
                        QState = QState TransTable[ QState ][ par_level_flag[ n ] ]
                } else {
                        sumAbsLevel = 0
                        for( n = numSbCoeff – 1; n >= 0; n – – ) {
                                xC = ( xS << log2SbW ) +
DiagScanOrder[ log2SbW ][ log2SbH ][ n ][ 0 ]
                                yC = ( yS << log2SbH ) +
```

-continued

```
DiagScanOrder[ log2SbW ][ log2SbH ][ n ][ 1 ]
                            if( AbsLevel[ xC ][ yC ] > 0 ) {
                                    TransCoeffLevel[ x0 ][ y0 ][ cIdx ][ xC ][ yC ] =
                                            AbsLevel[ xC ][ yC ] * ( 1 – 2 *
coeff_sign_flag[ n ] )
                            if( signHidden ) {
                                    sumAbsLevel += AbsLevel[ xC ][ yC ]
                                    if( ( n = firstSigScanPosSb ) &&
( sumAbsLevel % 2 ) = = 1 ) )
                    TransCoeffLevel[ x0 ][ y0 ][ cIdx ][ xC ][ yC ] =
                    –TransCoeffLevel[ x0 ][ y0 ][ cIdx ][ xC ][ yC ]
                                }
                    }
                }
            }
        }
}
```

{{intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions. }}

{{When intra_subpartitions_mode_flag[x0][y0] is not present, it is inferred to be equal to 0. }}

{{intra_subpartitions_split_flag[x0][y0] specifies whether the intra subpartitions split type is horizontal or vertical. When intra_subpartitions_split_flag[x0][y0] is not present, it is inferred as follows: }}

{{If cbHeight is greater than MaxTbSizeY, intra_subpartitions_split_flag[x0][y0] is inferred to be equal to 0. }}

{{Otherwise (cbWidth is greater than MaxTbSizeY), intra_subpartitions_split_flag[x0][y0] is inferred to be equal to 1. }}

The variable IntraSubPartitionsSplitType specifies the type of split used for the current luma coding block as illustrated in Table 7-16. IntraSubPartitionsSplitType is derived as follows:}}

If intra_subpartitions_mode_flag[x0][y0] is equal to 0, IntraSubPartitionsSplitType is set equal to 0. }}

Otherwise, the IntraSubPartitionsSplitType is set equal to 1+intra_subpartitions_split_flag[x0][y0]. }}

TABLE 7-16

| {{ IntraSubPartitionsSplitType}} | {{ Name of IntraSubPartitionsSplitType}} |
|---|---|
| {{ 0}} | {{ ISP_NO_SPLIT}} |
| {{ 1}} | {{ ISP_HOR_SPLIT}} |
| {{ 2}} | {{ ISP_VER_SPLIT}} |

Name association to IntraSubPartitionsSplitType }}

{{The variable NumIntraSubPartitions specifies the number of transform block subpartitions into which an intra {{luma coding block is divided. NumnIntraSubPartitions is derived as follows: }}

{{If IntraSubPartitionsSplitType is equal to ISP_NO_SPLIT, NumIntraSubPartitions is set equal to 1. }}

{{Otherwise, if one of the following conditions is true, NumIntraSubPartitions is set equal to 2: }}

{{cbWidth is equal to 4 and cbHeight is equal to 8, }}

{{cbWidth is equal to 8 and cbHeight is equal to 4. }}

{{Otherwise, NumIntraSubPartitions is set equal to 4. }}

8.4.5 Decoding Process for Intra Blocks

8.4.5.1 General Decoding Process for Intra Blocks

Inputs to this process are:

a sample location (xTb0, yTb0) specifying the top-left sample of the current transform block relative to the top-left sample of the current picture, a variable nTbW specifying the width of the current transform block, a variable nTbH specifying the height of the current transform block, a variable predModeIntra specifying the intra prediction mode, a variable cIdx specifying the colour component of the current block.

Output of this process is a modified reconstructed picture before in-loop filtering.

The maximum transform block width maxTbWidth and height maxTbHeight are derived as follows:

$$maxTbWidth=(cIdx==0)?MaxTbSizeY:MaxTbSizeY/SubWidthC \qquad (8\text{-}41)$$

$$maxTbHeight=(cIdx==0)?MaxTbSizeY:MaxTbSizeY/SubHeightC \qquad (8\text{-}42)$$

The luma sample location is derived as follows:

$$(xTbY,yTbY)=(cIdx==0)?(xTb0,yTb0):(xTb0*SubWidthC,yTb0*SubHeightC) \qquad (8\text{-}43)$$

Depending on maxTbSize, the following applies:

If IntraSubPartitionsSplitType is equal to ISP_NO_SPLIT and nTbW is greater than maxTbWidth or nTbH is greater than maxTbHeight, the following ordered steps apply.

1. The variables newTbW and newTbH are derived as follows:

$$newTbW=(nTbW>maxTbWidth)?(nTbW/2):nTbW \qquad (8\text{-}44)$$

$$newTbH=(nTbH>maxTbHeight)?(nTbH/2):nTbH \qquad (8\text{-}45)$$

2. The general decoding process for intra blocks as specified in this clause is invoked with the location (xTb0, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

3. If nTbW is greater than maxTbWidth, the general decoding process for intra blocks as specified in this clause is invoked with the location (xTb0, yTb0) set equal to (xTb0+newTbW, yTb0), the transform block width nTbW set equal to newTbW and the height nTbH set equal to newTbH, the intra prediction mode pred-ModeIntra, and the variable cIdx as inputs, and the output is a modified reconstructed picture before in-loop filtering.

4. If nTbH is greater than maxTbHeight, the general decoding process for intra blocks as specified in this clause is invoked with the location (xTb0, yTb0) set equal to (xTb0, yTb0+newTbH), the transform block width nTbW set equal to newTbW and the height nTbH set equal to newTbH, the intra prediction mode pred-ModeIntra, and the variable cIdx as inputs, and the output is a modified reconstructed picture before in-loop filtering.

5. If nTbW is greater than maxTbWidth and nTbH is greater than maxTbHeight, the general decoding process for intra blocks as specified in this clause is invoked with the location (xTb0, yTb0) set equal to (xTb0+newTbW, yTb0+newTbH), the transform block width nTbW set equal to newTbW and the height nTbH set equal to newTbH, the intra prediction mode pred-ModeIntra, and the variable cIdx as inputs, and the output is a modified reconstructed picture before in-loop filtering.

Otherwise, the following ordered steps apply:

S{{The variables nW, nH, nPbW, pbFactor, xPartInc and yPartInc are derived as follows: }}

$$\{\{nW=IntraSubPartitionsSplitType==ISP\_VER\_SPLIT?nTbW/$$
$$NumIntraSubPartitions:nTbW \qquad (8\text{-}46)\}\}$$

$$\{\{nH=IntraSubPartitionsSplitType==ISP\_HOR\_SPLIT?nTbH/$$
$$NumIntraSubPartitions:nTbH \qquad (8\text{-}47)\}\}$$

$$\{\{xPartInc=ISP\_VER\_SPLIT?1:0 \qquad (8\text{-}48)\}\}$$

$$\{\{yPartInc=ISP\_HOR\_SPLIT?1:0 \qquad (8\text{-}49)\}\}$$

$$\{\{nPbW=Max(4,nW) \qquad (8\text{-}50)\}\}$$

$$\{\{pbFactor=nPbW/nW \qquad (8\text{-}51)\}\}$$

{{The variables xPartIdx and yPartIdx are set equal to 0. }}

{{For i=0 . . . NumIntraSubPartitions−1, the following applies: }}

1. {{The variables xPartIdx and yPartIdx are updated as follows: }}

$$\{\{xPartIdx=xPartIdx+xPartInc \qquad (8\text{-}52)\}\}$$

$$\{\{yPartIdx=yPartIdx+yPartInc \qquad (8\text{-}53)\}\}$$

$$\{\{xPartPbIdx=xPartIdx \% pbFactor \qquad (8\text{-}54)\}\}$$

2. {{When xPartPbIdx is equal to 0, the intra sample prediction process as specified in clause 8.4.5.2 is invoked with the location (xTbCmp, yTbCmp) set equal to (xTb0+nW*xPartIdx, yTb0+nH*yPartIdx), the intra prediction mode predModeIntra, the transform block width nTbW and height nTbH set equal to nPbW and nH, the coding block width {{nCbW and height nCbH set equal to nTbW and nTbH, and the variable cIdx as inputs, and the output is an (nPbW)×(nH) array predSamples. }}

3. The scaling and transformation process as specified in clause 8.7.2 is invoked with the luma location (xTbY, yTbY) set equal to (xTbY+nW*xPartIdx, yTbY+nH*yPartIdx), the variable cIdx, the transform width nTbW and the transform height nTbH set equal to nW and nH as inputs, and the output is an (nW)×(nH) array resSamples.

4. The picture reconstruction process for a colour component as specified in clause 8.7.5 is invoked with the transform block location (xTbComp, yTbComp) set equal to (xTb0+nW*xPartIdx, yTb0+nH*yPartIdx), the transform block width nTbW, the transform block height nTbH set equal to nW and nH, the variable cIdx, the (nW)×(nH) array predSamples[x][y] with x=xPartPbIdx*nW . . . (xPartPbIdx+1)*nW−1, y=0 . . . nH−1, and the (nW)×(nH) array resSamples as inputs, and the output is a modified reconstructed picture before in-loop filtering.

8.4.5.2.5 General Intra Sample Prediction

Inputs to this process are:

a sample location (xTbCmp, yTbCmp) specifying the top-left sample of the current transform block relative to the top-left sample of the current picture, a variable predModeIntra specifying the intra prediction mode, a variable nTbW specifying the transform block width, a variable nTbH specifying the transform block height, a variable nCbW specifying the coding block width, a variable nCbH specifying the coding block height, a variable cIdx specifying the colour component of the current block.

Outputs of this process are the predicted samples pred-Samples[x][y], with x=0 . . . nTbW−1, y=0 . . . nTbH−1.

{{The variables refW and refH are derived as follows: }}

{{If IntraSubPartitionsSplitType is equal to ISP_NO_SPLIT or cIdx is not equal to 0, the following applies:

$$\{\{refW=nTbW*2 \qquad (8\text{-}118)\}\}$$

$$\{\{refH=nTbH*2 \qquad (8\text{-}119)\}\}$$

{{Otherwise (IntraSubPartitionsSplitType is not equal to ISP_NO_SPLIT and cIdx is equal to 0), the following applies: }}

$$\{\{refW=nCbW+nTbW \qquad (8\text{-}120)\}\}$$

$$\{\{refH=nCbH+nTbH \qquad (8\text{-}121)\}\}$$

The variable refIdx specifying the intra prediction reference line index is derived as follows:

$$refIdx=(cIdx==0)?IntraLumaRefLineIdx[xTbCmp]$$
$$[yTbCmp]:0 \qquad (8\text{-}122)$$

The wide angle intra prediction mode mapping process as specified in clause 8.4.5.2.6 is invoked with predModeIntra, nTbW, nTbH and cIdx as inputs, and the modified predModeIntra as output.

The variable refFilterFlag is derived as follows:

If predModeIntra is equal to one of the following values: 0, −14, −12, −10, −6, 2, 34, 66, 72, 76, 78, 80, then refFilterFlag is set equal to 1.

Otherwise, refFilterFlag is set equal to 0.

For the generation of the reference samples p[x][y] with x=−1−refIdx, y=−1−refIdx . . . refH−1 and x=−refIdx . . . refW−1, y=−1−refIdx, the following ordered steps apply:

1. The reference sample availability marking process as specified in clause 8.4.5.2.7 is invoked with the sample location (xTbCmp, yTbCmp), the intra prediction reference line index refIdx, the reference sample width refW, the reference sample height refH, the colour component cIdx as inputs, and the reference samples refUnfilt[x][y] with x=−1−refIdx, y=−1−refIdx . . . refH−1 and x=−refIdx . . . refW−1, y=−1−refIdx as output.

2. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.5.2.8 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.

3. The reference sample filtering process as specified in clause 8.4.5.2.9 is invoked with the intra prediction reference line index refIdx, the transform block width nTbW and height nTbH, the reference sample width refW, the reference sample height ref-, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The intra sample prediction process according to predModeIntra applies as follows:

If predModeIntra is equal to INTRA_PLANAR, the corresponding intra prediction mode process specified in clause 8.4.5.2.10 is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified in clause 8.4.5.2.11 is invoked with the transform block width nTbW, the transform block height nTbH, the intra prediction reference line index refIdx, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process specified in clause 8.4.5.2.13 is invoked with the intra prediction mode predModeIntra, the sample location (xTbC, yTbC) set equal to (xTbCmp, yTbCmp), the transform block width nTbW and height nTbH, the colour component index cIdx, and the reference sample array p as inputs, and the output is the predicted sample array predSamples.

Otherwise, the corresponding intra prediction mode process specified in clause 8.4.5.2.12 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the reference filter flag refFilterFlag, the colour component index cIdx, and the reference sample array p as inputs, and the predicted sample array predSamples as outputs.

When all of the following conditions are true, the position-dependent prediction sample filtering process specified in clause 8.4.5.2.14 is invoked with the intra prediction mode predModeIntra, the transform block width nTbW, the transform block height nTbH, the predicted samples pred- Samples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

nTbW is greater than or equal to 4 and nTbH is greater than or equal to 4 or cIdx is not equal to 0 refIdx is equal to 0 or cIdx is not equal to 0

BdpcmFlag[xTbCmp][xTbCmp] is equal to 0

One of the following conditions is true:

predModeIntra is equal to INTRA_PLANAR predModeIntra is equal to INTRA_DC predModeIntra is less than or equal to INTRA_ANGULAR18 predModeIntra is less than or equal to INTRA_ANGULAR50

8.4.5.2.6 Wide Angle Intra Prediction Mode Mapping Process

Inputs to this process are:

a variable predModeIntra specifying the intra prediction mode, a variable nTbW specifying the transform block width, a variable nTbH specifying the transform block height, a variable cIdx specifying the colour component of the current block.

Output of this process is the modified intra prediction mode predModeIntra.

Output of this process is the modified intra prediction mode predModeIntra.

The variables nW and nH are derived as follows:

{{If IntraSubPartitionsSplitType is equal to ISP_NO_SPLIT or cIdx is not equal to 0, the following applies: }}

$$\{\{nW = nTbW \qquad\qquad (8\text{-}123)\}\}$$

$$\{\{nH = nTbH \qquad\qquad (8\text{-}124)\}\}$$

{{Otherwise (IntraSubPartitionsSplitType is not equal to ISP_NO_SPLIT and cIdx is equal to 0), the following applies: }}

$$\{\{nW = nCbW \qquad\qquad (8\text{-}125)\}\}$$

$$\{\{nH = nCbH \qquad\qquad (8\text{-}126)\}\}$$

The variable whRatio is set equal to Abs(Log 2(nW/nH)).

For non-square blocks (nW is not equal to nH), the intra prediction mode predModeIntra is modified as follows:

If all of the following conditions are true, predModeIntra is set equal to (predModeIntra+65).

nW is greater than nH predModeIntra is greater than or equal to 2 predModeIntra is less than (whRatio>1)?(8+2*whRatio):8

Otherwise, if all of the following conditions are true, predModeIntra is set equal to (predModeIntra−67).

nH is greater than nW predModeIntra is less than or equal to 66 predModeIntra is greater than (whRatio>1)?(60−2*whRatio):60

8.7.4 Transformation Process for Scaled Transform Coefficients 8.7.4.1 General

Inputs to this process are:

a luma location (xTbY, yTbY) specifying the top-left sample of the current luma transform block relative to the top-left luma sample of the current picture, a variable nTbW specifying the width of the current transform block, a variable nTbH specifying the height of the current transform block, a variable cIdx specifying the colour component of the current block, an (nTbW)×(nTbH) array d[x][y] of scaled transform coefficients with x=0 . . . nTbW−1, y=0 . . . nTbH−1. Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2Lfnst-Size, nLfnstSize, and nonZeroSize are derived as follows: predModeIntra=(cIdx==0)?IntraPredModeY[xTbY][yTbY]: IntraPredModeC[xTbY][yTbY](8-965)

$$nLfnstOutSize=(nTbW>=8\&\& nTbH>=8)?48:16 \qquad (8\text{-}966)$$

$$\log 2LfnstSize=(nTbW>=8\&\& nTbH>=8)?3:2 \qquad (8\text{-}967)$$

$$nLfnstSize=1<<\log 2LfnstSize \qquad (8\text{-}968)$$

$$nonZeroSize=((nTbW==4\&\& nTbH==4) \\ (nTbW==8\&\& nTbH==8))?8:16 \qquad (8\text{-}969)$$

When intra_mip_flag[xTbComp][yTbComp] is equal to 1 and cIdx is equal to 0, predModeIntra is set equal to INTRA_PLANAR.

When predModeIntra is equal to either INTRA_LT_C-CLM, INTRA_L_CCLM, or INTRA_T_CCLM, pred-ModeIntra is set equal to IntraPredModeY[xTbY+nTbW/2][yTbY+nTbH/2].

The wide angle intra prediction mode mapping process as specified in clause 8.4.5.2.6 is invoked with predModeIntra, nTbW, nTbH and cIdx as inputs, and the modified predModeIntra as output.

The values of the list u[x] with x=0 . . . nonZeroSize−1 are derived as follows:

$$xC=DiagScanOrder[2][2][x][0] \qquad (8\text{-}970)$$

$$yC=DiagScanOrder[2][2][x][1] \qquad (8\text{-}971)$$

$$u[x]=d[xC][yC] \qquad (8\text{-}972)$$

The one-dimensional low frequency non-separable trans-formation process as specified in clause 8.7.4.2 is invoked with the input length of the scaled transform coefficients nonZeroSize, the transform output length nTrS set equal to nLfnstOutSize, the list of scaled non-zero transform coefficients u[x] with x=0 . . . nonZeroSize−1, the intra prediction mode for LFNST set selection predModeIntra, and the LFNST index for transform selection in the selected LFNST set lfnst_idx[xTbY][yTbY] as inputs, and the list v[x] with x=0 . . . nLfnstOutSize−1 as output.

The array d[x][y] with x=0 . . . nLfnstSize−1, y=0 . . . nLfnstSize−1 is derived as follows:

If predModeIntra is less than or equal to 34, the following applies:

$$d[x][y]=(y<4)?v[x+(y<<\log 2LfnstSize)]:((x<4)? \\ v[32+x+((y-4)<<2)]:d[x][y]) \qquad (8\text{-}973)$$

Otherwise, the following applies:

$$d[x][y]=(x<4)?v[y+(x<<\log 2LfnstSize)]:((y<4)?v[32+ \\ y+((x-4)<<2)]:d[x][y]) \qquad (8\text{-}974)$$

The variable implicitMtsEnabled is derived as follows:

If sps_mts_enabled_flag is equal to 1 and one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag is equal to 0 and CuPredMode[0][xTbY][yTbY] is equal to MOD-E_INTRA and lfnst_idx[x0][y0] is equal to 0 and intra_mip_flag[x0][y0] is equal to 0

Otherwise, implicitMtsEnabled is set equal to 0.

The variable trTypeHor specifying the horizontal trans-form kernel and the variable trTypeVer specifying the ver-tical transform kernel are derived as follows:

If cIdx is greater than 0, trTypeHor and trTypeVer are set equal to 0.

Otherwise, if implicitMtsEnabled is equal to 1, the fol-lowing applies:

{{If IntraSubPartitionsSplitType is not equal to ISP_NO_SPLIT or sps_explicit_mts_intra_enabled_flag is equal to 0 and CuPredMode[0][xTbY][yTbY] is equal to MODE_INTRA, trType-Hor and trTypeVer are derived as follows: }}

$$\{\{trTypeHor=(nTbW>=4\&\& nTbW<=16)?1:0 \qquad (8\text{-}975)\}\}$$

$$\{\{trTypeVer=(nTbH>=4\&\& nTbH<=16)?1:0 \qquad (8\text{-}976)\}\}$$

Otherwise (cu_sbt_flag is equal to 1), trTypeHor and trTypeVer are specified in Table 8-15 depending on cu_sbt_horizontal_flag and cu_sbt_pos_flag.

Otherwise, trTypeHor and trTypeVer are specified in Table 8-14 depending on tu_mts_idx[xTbY][yTbY]. The variables nonZeroW and nonZeroH are derived as follows:

If lfnst_idx[xTbY][yTbY] is not equal to 0 and nTbW is greater than or equal to 4 and nTbH is greater than or equal to 4, the following applies:

$$nonZeroW=(nTbW==4||nTbH==4)?4:8 \qquad (8\text{-}977)$$

$$nonZeroH=(nTbW==4||nTbH==4)?4:8 \qquad (8\text{-}978)$$

Otherwise, the following applies:

$$nonZeroW=Min(nTbW,(trTypeHor>0)?16:32) \qquad (8\text{-}979)$$

$$nonZeroH=Min(nTbH,(trTypeVer>0)?16:32) \qquad (8\text{-}980)$$

The (nTbW)×(nTbH) array r of residual samples is derived as follows:

1. When nTbH is greater than 1, each (vertical) column of scaled transform coefficients d[x][y] with x=0 . . . nonZeroW−1, y=0 . . . nonZeroH−1 is transformed to e[x][y] with x=0 . . . nonZeroW−1, y=0 . . . nTbH−1 by invoking the one-dimensional transformation process as specified in clause 8.7.4.4 for each column x=0 . . . nonZeroW−1 with the height of the transform block nTbH, the non-zero height of the scaled transform coefficients nonZeroH, the list d[x][y] with y=0 . . . nonZeroH−1 and the transform type variable trType set equal to trTypeVer as inputs, and the output is the list e[x][y] with y=0 . . . nTbH−1.

2. When nTbH and nTbW are both greater than 1, the intermediate sample values g[x][y] with x=0 . . . nonZeroW−1, y=0 . . . nTbH−1 are derived as follows:

$$g[x][y]=Clip3(CoeffMin,CoeffMax,(e[x][y]+64)>>7) \qquad (8\text{-}981)$$

3. When nTbW is greater than 1, each (horizontal) row of the resulting array g[x][y] with x=0 . . . nonZeroW−1, y=0 . . . nTbH−1 is transformed to r[x][y] with x=0 . . . nTbW−1, y=0 . . . nTbH−1 by invoking the one-dimensional transformation process as specified in clause 8.7.4.4 for each row y=0 . . . nTbH−1 with the width of the transform block nTbW, the non-zero width of the resulting array g[x][y] nonZeroW, the list g[x][y] with x=0 . . . nonZeroW−1 and the transform type variable trType set equal to trTypeHor as inputs, and the output is the list r[x][y] with x=0 . . . nTbW−1.

4. When nTbW is equal to 1, r[x][y] is set equal to e[x][y] for x=0 . . . nTbW−1, y=0 . . . nTbH−1.

TABLE 8-14

Specification of trTypeHor and trTypeVer depending on tu_mts_idx[ x ][ y ]

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 8-15

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

2. Examples of Technical Problems Solved by Technical Solutions Provided in the Present Disclosure Some example problems are listed as follows:

(1) In some scenarios, xPartIdx and yPartIdx are increased by xPardInc and yPartInc before invoking the intra sample prediction process for the first TU. Therefore, when ISP is applied, e.g., xPartInc or yPartInc is not equal to zero, the first part of the CU cannot be predicted appropriately.

(2) The wide-angle intra-prediction mode mapping is conducted according to CU dimensions instead of TU dimensions when ISP is applied.

(3) A delta QP is signaled for a CU coded with ISP. However, there may be a latency that the delta QP is signaled not in the first TU of ISP.

(4) Transform skip is not allowed for an ISP-coded block.

(5) The intra-prediction reference samples are fetched depending on whether the current block is ISP-coded or not.

(6) The implicit transform selection approach does not consider the case in which TU is not a prediction unit when ISP is applied.

(7) Deblocking filter needs to access the QPs used for encoding/decoding a coding block covering the samples at edges. However, the QP of a coding block (e.g., CU) is undefined when one CU contains multiple TUs (e.g., when ISP is enabled).

3. A Listing of Example Embodiments and Techniques

The list below should be considered as examples to explain general concepts. These items should not be interpreted in a narrow way. Furthermore, these items can be combined in any manner.

In the following descriptions, the term 'ISP' may not be interpreted in a narrow way. Any kinds of tools that may split one CU into multiple TUs/PUs may also be treated as ISP.

1. When ISP is used, the intra-prediction process should be applied for each sub-partitions, including the first sub-partition with the same top-left position as the current CU.
   a. In one example, the variables xPartIdx, yPartIdx and xPartPbIdx as defined in section 8.4.5.1 (of the VC standard) may be updated after the intra-prediction process and/or the scaling/transformation process and/or the reconstruction process.

2. When a specific coding tool is applied, the wide-angle intra-prediction mode mapping is conducted depending on the prediction unit dimensions, instead of the CU dimensions.
   a. Alternatively, when a specific coding tool is applied, the wide-angle intra-prediction is not applied.
      i. In one example, when a specific coding tool is applied, wide-angle intra-prediction mapping is not invoked.
      ii. In one example, when a specific coding tool is applied, wide-angle intra-prediction mapping is an identical mapping, e.g. any mode M is kept being M after the mapping.
   b. In one example, the specific coding tool may be ISP.

3. When ISP is applied, delta QP may be signaled only once for the whole CU.
   a. In one example, it may be signaled in the first TU.
   b. Alternatively, when ISP is applied, delta QP is always signaled in the last TU.
   c. Alternatively, delta QP is not signaled when ISP is applied.
   d. In one example, delta QP is signaled with the specific TU (first/last) regardless whether it contains non-zero coefficients (luma block or luma and chroma blocks).
      i. Alternatively, delta QP is signaled with the specific TU (first/last) only when it contains non-zero coefficients (luma block or luma and chroma blocks).
         1) Alternatively, furthermore, if there are no non-zero coefficients, delta QP is inferred to be 0.

4. It is proposed to define a CU's QP as a QP associated with a TU within the CU.
   a. In one example, the CU's QP may be defined as the QP associated with the first/last TU in the CU.
   b. Alternatively, a CU's QP may be defined as the QP before adding delta QPs for different TUs in the current CU.
   c. Alternatively, a CU's QP may be defined as the QP derived from a function (e.g., average) of multiple TUs' QPs with delta QPs applied.
   d. In one example, how to apply deblocking filter may use the above defined CU's QPs.

5. Whether to/how to apply deblocking filter (e.g., decision of luma/chroma block edges) may depend on the QPs used for the transform block/transform unit covering the corresponding samples instead of coding unit.

a. Alternatively, when one block is coded with ISP mode, the checking of CU's QP may be modified to check the TU's QP.

b. Alternatively, when one block is larger than the VPDU/maximum transform block sizes, the checking of CU's QP may be modified to check the TU's QP.

6. When ISP is applied, transform skip may be used.

a. In one example, whether transform skip is used when ISP is applied may depend on the coding block/prediction block/transform block dimensions.

b. In one example, whether transform skip is used when ISP is applied may depend on whether vertical or horizontal ISP is applied.

7. Same intra-prediction reference samples are fetched no matter whether the current block is ISP-coded or not.

a. In one example, suppose the width and height of the current transform block are W and H, respectively, then 2*W above neighboring sample and 2*H left neighboring samples are fetched when the current block is ISP-coded.

8. Implicit transform selection is conducted in different ways depending on whether ISP is used or not used.

a. In one example, the horizontal transform and/or vertical transform may be selected depending on whether the transform block width is larger than K, K is an integer such as 1 or 2.

9. The horizontal transform and/or vertical transform may be selected depending on whether the transform block height is larger than K, K is an integer such as 1 or 2. When lossless coding is applied, a specific transform may be restricted on ISP coded block.

a. When lossless coding is applied, 4×4 transform may be restricted on ISP coded block.

b. In one example, when lossless coding is applied, a transform size restriction may be applied to ISP coded blocks that the transform size is forced to be P×Q, such as 4×4.

i. In one example, if a M×N block is vertically split to four M/4×N sub-partitions by ISP mode, then for each sub-partition, the M/4×N block may be inferred to split to 4×4 transform blocks and perform transform and quantization.

c. In one example, when lossless coding is applied, a coding block size limitation may be applied to ISP blocks.

i. In one example, the width of each ISP sub-partition may be not smaller than 4.

ii. In one example, the height of each ISP sub-partition may be not smaller than 4.

d. In one example, when lossless coding is applied, the ISP split flag (such as intra_subpartitions_split_flag) may be dependent on coding block dimensions.

i. In one example, the split direction (horizontal or vertical) that causes the width or height of ISP sub-partition smaller than 4 may be not allowed.

ii. In one example, for an 8×16 ISP-coded block, the split flag may be inferred to be horizontally split, thus the ISP split flag (such as intra_subpartitions_split_flag) is not signaled and inferred.

10. When lossless coding is applied, ISP may be disabled.

a. Alternatively, lossless coding may be disabled in an ISP-coded block.

b. In one example, when the CU/coding tree unit (CTU)/virtual pipeline data unit (VPDU)/slice/picture/sequence level trans-quant bypass enabled flag is true, ISP may be not allowed for the current video unit (such as current CU/CTU/VPDU/slice/picture/sequence).

11. It is allowed that none of the TUs split by ISP have non-zero coefficients.

a. It is allowed that all of the TUs split by ISP only have zero coefficients.

b. Coded block flag (Cbf) flags may be signaled for all TUs split by ISP.

4. Additional Example Embodiments

In the following examples, the newly added parts are in double braces {{ }}, and the deleted parts are indicated between [[ ]].

4.1 Example Modification on the General Decoding Process for Intra Blocks 8.4.5.1 General Decoding Process for Intra Blocks Inputs to this process are:

a sample location (xTb0, yTb0) specifying the top-left sample of the current transform block relative to the top-left sample of the current picture, a variable nTbW specifying the width of the current transform block, a variable nTbH specifying the height of the current transform block, a variable predModeIntra specifying the intra prediction mode, a variable cIdx specifying the colour component of the current block.

Output of this process is a modified reconstructed picture before in-loop filtering.

The maximum transform block width maxTbWidth and height maxTbHeight are derived as follows:

$$maxTbWidth=(cIdx==0)?MaxTbSizeY:MaxTbSizeY/SubWidthC \qquad (8\text{-}41)$$

$$maxTbHeight=(cIdx==0)?MaxTbSizeY:MaxTbSizeY/SubHeightC \qquad (8\text{-}42)$$

The luma sample location is derived as follows:

$$(xTbY,yTbY)=(cIdx==0)?(xTb0,yTb0):(xTb0*SubWidthC,yTb0*SubHeightC) \qquad (8\text{-}43)$$

Depending on maxTbSize, the following applies:

If IntraSubPartitionsSplitType is equal to ISP_NO_SPLIT and nTbW is greater than maxTbWidth or nTbH is greater than maxTbHeight, the following ordered steps apply.

1. The variables newTbW and newTbH are derived as follows:

$$newTbW=(nTbW>maxTbWidth)?(nTbW/2):nTbW \qquad (8\text{-}44)$$

$$newTbH=(nTbH>maxTbHeight)?(nTbH/2):nTbH \qquad (8\text{-}45)$$

2. The general decoding process for intra blocks as specified in this clause is invoked with the location (xTb0, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

3. If nTbW is greater than maxTbWidth, the general decoding process for intra blocks as specified in this clause is invoked with the location (xTb0, yTb0) set equal to (xTb0+newTbW, yTb0), the transform block width nTbW set equal to newTbW and the height nTbH set equal to newTbH, the intra prediction mode pred- ModeIntra, and the variable cIdx as inputs, and the output is a modified reconstructed picture before in-loop filtering.

4. If nTbH is greater than maxTbHeight, the general decoding process for intra blocks as specified in this clause is invoked with the location (xTb0, yTb0) set equal to (xTb0, yTb0+newTbH), the transform block width nTbW set equal to newTbW and the height nTbH set equal to newTbH, the intra prediction mode pred-ModeIntra, and the variable cIdx as inputs, and the output is a modified reconstructed picture before in-loop filtering.

5. If nTbW is greater than maxTbWidth and nTbH is greater than maxTbHeight, the general decoding process for intra blocks as specified in this clause is invoked with the location (xTb0, yTb0) set equal to (xTb0+newTbW, yTb0+newTbH), the transform block width nTbW set equal to newTbW and the height nTbH set equal to newTbH, the intra prediction mode pred-ModeIntra, and the variable cIdx as inputs, and the output is a modified reconstructed picture before in-loop filtering.

Otherwise, the following ordered steps apply:
The variables nW, nH, nPbW, pbFactor, xPartInc and yPartInc are derived as follows:

$$nW=IntraSubPartitionsSplitType==ISP\_VER\_SPLIT?nTbW/$$
$$NumIntraSubPartitions:nTbW \qquad (8\text{-}46)$$

$$nH=IntraSubPartitionsSplitType==ISP\_HOR\_SPLIT?nTbH/$$
$$NumIntraSubPartitions:nTbH \qquad (8\text{-}47)$$

$$xPartInc=ISP\_VER\_SPLIT?1:0 \qquad (8\text{-}48)$$

$$yPartInc=ISP\_HOR\_SPLIT?1:0 \qquad (8\text{-}49)$$

$$nPbW=Max(4,nW) \qquad (8\text{-}50)$$

$$pbFactor=nPbW/nW \qquad (8\text{-}51)$$

The variables xPartPbIdx, xPartIdx and yPartIdx are set equal to 0.

For i=0 . . . NumIntraSubPartitions−1, the following applies:

[[1. The variables xPartIdx and yPartIdx are updated as follows:

$$xPartIdx=xPartIdx+xPartInc \qquad (8\text{-}52)$$

$$yPartIdx=yPartIdx+yPartInc \qquad (8\text{-}53)$$

$$xPartPbIdx=xPartIdx \% pbFactor \qquad (8\text{-}54)]]$$

1. When xPartPbIdx is equal to 0, the intra sample prediction process as specified in clause 8.4.5.2 is invoked with the location (xTbCmp, yTbCmp) set equal to (xTb0+nW*xPartIdx, yTb0+nH*yPartIdx), the intra prediction mode predModeIntra, the transform block width nTbW and height nTbH set equal to nPbW and nH, the coding block width nCbW and height nCbH set equal to nTbW and nTbH, and the variable cIdx as inputs, and the output is an (nPbW)×(nH) array predSamples.

2. The scaling and transformation process as specified in clause 8.7.2 is invoked with the luma location (xTbY, yTbY) set equal to (xTbY+nW*xPartIdx, yTbY+nH*yPartIdx), the variable cIdx, the transform width nTbW and the transform height nTbH set equal to nW and nH as inputs, and the output is an (nW)×(nH) array resSamples.

3. The picture reconstruction process for a colour component as specified in clause 8.7.5 is invoked with the transform block location (xTbComp, yTbComp) set equal to (xTb0+nW*xPartIdx, yTb0+nH*yPartIdx), the transform block width nTbW, the transform block height nTbH set equal to nW and nH, the variable cIdx, the (nW)×(nH) array predSamples[x][y] with x=xPartPbIdx*nW . . . (xPartPbIdx+1)*nW−1, y=0 . . . nH−1, and the (nW)×(nH) array resSamples as inputs, and the output is a modified reconstructed picture before in-loop filtering.

4. {{The variables xPartIdx, yPartIdx and xPartPbIdx— are updated as follows: }}
   {{xPartIdx=xPartIdx+xPartInc}}
   {{yPartIdx=yPartIdx+yPartInc}}
   {{xPartPbIdx=xPartIdx % pbFactor}}

4.2 Example Modification on the Wide-Angle Intra-Prediction Mapping for Intra Blocks Wide Angle Intra Prediction Mode Mapping Process
   Inputs to this process are:
   a variable predModeIntra specifying the intra prediction mode,
   a variable nTbW specifying the transform block width,
   a variable nTbH specifying the transform block height,
   a variable cIdx specifying the colour component of the current block.
   Output of this process is the modified intra prediction mode predModeIntra.
   Output of this process is the modified intra prediction mode predModeIntra.
   The variables nW and nH are derived as follows:
   [[If IntraSubPartitionsSplitType is equal to ISP_NO_SPLIT or cIdx is not equal to 0, the following applies:]]

$$nW=nTbW \qquad (8\text{-}123)$$

$$nH=nTbH \qquad (8\text{-}124)$$

[[Otherwise (IntraSubPartitionsSplitType is not equal to ISP_NO_SPLIT and cIdx is equal to 0), the following applies:

$$nW=nCbW \qquad (8\text{-}125)$$

$$nH=nCbH \qquad (8\text{-}126)]]$$

The variable whRatio is set equal to Abs(Log 2(nW/nH)).
   For non-square blocks (nW is not equal to nH), the intra prediction mode predModeIntra is modified as follows:
   If all of the following conditions are true, predModeIntra is set equal to (predModeIntra+65).
      nW is greater than nH
      predModeIntra is greater than or equal to 2
      predModeIntra is less than (whRatio>1)?(8+2*whRatio): 8
   Otherwise, if all of the following conditions are true, predModeIntra is set equal to (predModeIntra−67).
      nH is greater than nW
      predModeIntra is less than or equal to 66
         predModeIntra is greater than (whRatio>1)?(60-2*whRatio): 60

8.7.4 Transformation Process for Scaled Transform Coefficients 8.7.4.1 General
   Inputs to this process are:
   a luma location (xTbY, yTbY) specifying the top-left sample of the current luna transform block relative to the top-left luma sample of the current picture, a variable nTbW specifying the width of the current transform block, a variable nTbH specifying the height of the current transform block, a variable cIdx specifying the colour component of the current block, an (nTbW)×(nTbH) array d[x][y] of scaled transform coefficients with x=0 . . . nTbW−1, y=0 . . . nTbH−1.

{{a variable nPW specifying the width of the prediction block for the current transform block, }}

{{a variable nPH specifying the height of the prediction block for the current transform block, }}

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

$$predModeIntra=(cIdx=0)?IntraPredModeY[xTbY][yTbY]:IntraPredModeC[xTbY][yTbY] \quad (8\text{-}965)$$

$$nLfnstOutSize=(nTbW>=8\&\& nTbH>=8)?48:16 \quad (8\text{-}966)$$

$$log\ 2LfnstSize=(nTbW>=8\&\& nTbH>=8)?3:2 \quad (8\text{-}967)$$

$$nLfnstSize=1<<log\ 2LfnstSize \quad (8\text{-}968)$$

$$nonZeroSize=((nTbW==4\&\& nTbH==4)\|(nTbW==8\&\& nTbH==8))?8:16 \quad (8\text{-}969)$$

When intra_mip_flag[xTbComp][yTbComp] is equal to 1 and cIdx is equal to 0, predModeIntra is set equal to INTRA_PLANAR.

When predModeIntra is equal to either INTRA_LT_C-CLM, INTRA_L_CCLM, or INTRA_T_CCLM, predModeIntra is set equal to IntraPredModeY[xTbY+nTbW/2][yTbY+nTbH/2].

The wide angle intra prediction mode mapping process as specified in clause 8.4.5.2.6 is invoked with predModeIntra, {{nPW, nPH}} and cIdx as inputs, and the modified predModeIntra as output.

. . .

8.4.5.1 General Decoding Process for Intra Blocks

Inputs to this process are:

a sample location (xTb0, yTb0) specifying the top-left sample of the current transform block relative to the top-left sample of the current picture, a variable nTbW specifying the width of the current transform block, a variable nTbH specifying the height of the current transform block, a variable predModeIntra specifying the intra prediction mode, a variable cIdx specifying the colour component of the current block.

Output of this process is a modified reconstructed picture before in-loop filtering.

The maximum transform block width maxTbWidth and height maxTbHeight are derived as follows:

$$maxTbWidth=(cIdx==0)?MaxTbSizeY:MaxTbSizeY/SubWidthC \quad (8\text{-}41)$$

$$maxTbHeight=(cIdx==0)?MaxTbSizeY:MaxTbSizeY/SubHeightC \quad (8\text{-}42)$$

The luma sample location is derived as follows:

$$(xTbY,yTbY)=(cIdx==0)?(xTb0,yTb0):(xTb0*SubWidthC,yTb0*SubHeightC) \quad (8\text{-}43)$$

Depending on maxTbSize, the following applies:

If IntraSubPartitionsSplitType is equal to ISP_NO_SPLIT and nTbW is greater than maxTbWidth or nTbH is greater than maxTbHeight, the following ordered steps apply.

1. The variables newTbW and newTbH are derived as follows:

$$newTbW=(nTbW>maxTbWidth)?(nTbW/2):nTbW \quad (8\text{-}44)$$

$$newTbH=(nTbH>maxTbHeight)?(nTbH/2):nTbH \quad (8\text{-}45)$$

2. The general decoding process for intra blocks as specified in this clause is invoked with the location (xTb0, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

3. If nTbW is greater than maxTbWidth, the general decoding process for intra blocks as specified in this clause is invoked with the location (xTb0, yTb0) set equal to (xTb0+newTbW, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

4. If nTbH is greater than maxTbHeight, the general decoding process for intra blocks as specified in this clause is invoked with the location (xTb0, yTb0) set equal to (xTb0, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

5. If nTbW is greater than maxTbWidth and nTbH is greater than maxTbHeight, the general decoding process for intra blocks as specified in this clause is invoked with the location (xTb0, yTb0) set equal to (xTb0+newTbW, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

Otherwise, the following ordered steps apply:

The variables nW, nH, nPbW, pbFactor, xPartInc and yPartInc are derived as follows:

$$nW=IntraSubPartitionsSplitType==ISP\_VER\_SPLIT?nTbW/NumIntraSubPartitions:nTbW \quad (8\text{-}46)$$

$$nH=IntraSubPartitionsSplitType==ISP\_HOR\_SPLIT?nTbH/NumIntraSubPartitions:nTbH \quad (8\text{-}47)$$

$$xPartInc=ISP\_VER\_SPLIT?1:0 \quad (8\text{-}48)$$

$$yPartInc=ISP\_HOR\_SPLIT?1:0 \quad (8\text{-}49)$$

$$nPbW=Max(4,nW) \qquad (8\text{-}50)$$

$$pbFactor=nPbW/nW \qquad (8\text{-}51)$$

The variables xPartIdx and yPartIdx are set equal to 0.

For i=0 . . . NumIntraSubPartitions−1, the following applies:

[[1. The variables xPartIdx and yPartIdx are updated as follows:

$$xPartIdx=xPartIdx+xPartInc \qquad (8\text{-}52)$$

$$yPartIdx=yPartIdx+yPartInc \qquad (8\text{-}53)$$

$$xPartPbIdx=xPartIdx \ \% \ pbFactor \qquad (8\text{-}54)]]$$

1. When xPartPbIdx is equal to 0, the intra sample prediction process as specified in clause 8.4.5.2 is invoked with the location (xTbCmp, yTbCmp) set equal to (xTb0+nW*xPartIdx, yTb0+nH*yPartIdx), the intra prediction mode predModeIntra, the transform block width nTbW and height nTbH set equal to nPbW and nH, the coding block width nCbW and height nCbH set equal to nTbW and nTbH, and the variable cIdx as inputs, and the output is an (nPbW)×(nH) array predSamples.

2. The scaling and transformation process as specified in clause 8.7.2 is invoked with the luma location (xTbY, yTbY) set equal to (xTbY+nW*xPartIdx, yTbY+ nH*yPartIdx), the variable cIdx, the transform width nTbW and the transform height nTbH set equal to nW and nH as inputs, and the output is an (nW)×(nH) array resSamples.

3. The picture reconstruction process for a colour component as specified in clause 8.7.5 is invoked with the transform block location (xTbComp, yTbComp) set equal to (xTb0+nW*xPartIdx, yTb0+nH*yPartIdx), the transform block width nTbW, the transform block height nTbH set equal to nW and nH, {{the prediction block width nPW, the prediction block height nPH set equal to nPbW and nH}}, the variable cIdx, the (nW)× (nH) array predSamples[x][y] with x=xPartPbIdx* nW . . . (xPartPbIdx+1)*nW−1, y=0 . . . nH−1, and the (nW)×(nH) array resSamples as inputs, and the output is a modified reconstructed picture before in-loop filtering.

4. {{The variables xPartIdx, yPartIdx and xPartPbIdx—are updated as follows: }}

{{xPartIdx=xPartIdx+xPartInc}}

{{yPartIdx=yPartIdx+yPartInc}}

{{xPartPbIdx=xPartIdx % pbFactor}}

4.3 Example Modification on Delta QP.

|  | Descriptor |
|---|---|
| transform_unit( x0, y0, tbWidth, tbHeight, treeType, subTuIndex, chType ) { | |
|     if( ( treeType = = SINGLE_TREE \| \| treeType = = DUAL_TREE_CHROMA ) && | |
|         ChromaArrayType != 0 ) { | |
|       if( ( IntraSubPartitionsSplitType = = ISP_NO_SPLIT && !( cu_sbt_flag && | |
|         ( ( subTuIndex = = 0 && cu_sbt_pos_flag ) \| \| | |
|          ( subTuIndex = = 1 && !cu_sbt_pos_flag ) ) ) \| \| | |
|         ( IntraSubPartitionsSplitType != ISP_NO_SPLIT && | |
|         ( subTuIndex = = NumIntraSubPartitions − 1 ) ) ) { | |
|         tu_cbf_cb[ x0 ][ y0 ] | ae(v) |
|         tu_cbf_cr[ x0 ][ y0 ] | ae(v) |
|       } | |
|     } | |
|     if( treeType = = SINGLE_TREE \| \| treeType = = DUAL_TREE_LUMA ) { | |
|       if( ( IntraSubPartitionsSplitType = = ISP_NO_SPLIT && !( cu_sbt_flag && | |
|         ( ( subTuIndex = = 0 && cu_sbt_pos_flag ) \| \| | |
|         ( subTuIndex = = 1 && !cu_sbt_pos_flag ) ) ) && | |
|         ( CuPredMode[ chType ][ x0 ][ y0 ] = = MODE_INTRA = \| \| | |
|         tu_cbf_cb[ x0 ][ y0 ] \| \| tu_cbf_cr[ x0 ][ y0 ] \| \| | |
|         CbWidth[ chType ][ x0 ][ y0 ] > Max TbSize Y \| \| | |
|         CbHeight[ chType ][ x0 ][ y0 ] > MaxTbSizeY ) \| \| | |
|         ( IntraSubPartitionsSplitType != ISP_NO_SPLIT && | |
|         ( subTuIndex < NumIntraSubPartitions − 1 \| \| !InferTuCbfLuma) ) ) | |
|         tu_cbf_luma[ x0 ][ y0 ] | ae(v) |
|       if (IntraSubPartitionsSplitType != ISP_NO_SPLIT ) | |
|         InferTuCbfLuma = InferTuCbfLuma && !tu_cbf_luma[ x0 ][ y0 ] | |
|     } | |
|     if( IntraSubPartitionsSplitType != ISP_NO_SPLIT && | |
|      treeType = = SINGLE_TREE && subTuIndex = = NumIntraSubPartitions − 1 ) ) | |
|      xC = CbPosX[ chType ][ x0 ][ y0 ] | |
|      yC = CbPosY[ chType ][ x0 ][ y0 ] | |
|      wC = CbWidth[ chType ][ x0 ][ y0 ] / SubWidthC | |
|      hC = CbHeight[ chType ][ x0 ][ y0 ] / SubHeightC | |
|     } else | |
|      xC = x0 | |
|      yC = y0 | |
|      wC = tbWidth / SubWidthC | |
|      hC = tbHeight / SubHeightC | |
|     } | |
|     if( ( CbWidth[ chType ][ x0 ][ y0 ] > 64 \| \| CbHeight[ chType ][ x0 ][ y0 ] > 64 \| \| | |
|       tu_cbf_luma[ x0 ][ y0 ] \| \| tu_cbf_cb[ x0 ][ y0 ] \| \| tu_cbf_cr[ x0 ][ y0 ] ) && | |
|       treeType != DUAL_TREE_CHROMA {{ \| \| IntraSubPartitionsSplitType != | |
| ISP_NO_SPLIT) }}{ | |
|       if( cu_qp_delta_enabled_flag && !IsCuQpDeltaCoded ) { | |

-continued

| | Descriptor |
|---|---|
| cu_qp_delta_abs | ae(v) |
| if( cu_qp_delta_abs ) | |
| cu_qp_delta_sign_flag | ae(v) |
| } | |
| } | |
| if( ( tu_cbf_cb[ x0 ][ y0 ] \| \| tu_cbf_cr[ x0 ][ y0 ] ) { | |
| if( cu_chroma_qp_offset_enabled_flag && !IsCuChromaQpOffsetCoded) { | |
| cu_chroma_qp_offset_flag | ae(v) |
| if( cu_chroma_qp_offset_flag && chroma_qp_off- | |
| set_list_len_minus]1 > 0 ) | |
| cu_chroma_qp_offset_idx | ae(v) |
| } | |
| } | |
| if( sps_joint_cbcr_enabled_flag && ( ( CuPredMode[ chType ][ x0 ][ y0 ] = = | |
| MODE_INTRA | |
| && ( tu_cbf_cb[ x0 ][ y0 ] tu_cbf_cr[x0 ][ y0 ] ) ) ) \| \| | |
| ( tu_cbf_cb[ x0 ][ y0 ] && tu_cbf_cr[ x0 ][ y0 ]) ) ) | |
| tu_joint_cbcr_residual_flag[ x0 ][ y0 ] | ae(v) |
| if( tu_cbf_luma[ x0 ][ y0 ] && treeType != DUAL_TREE_CHROMA | |
| && ( tbWidth <= 32 ) && ( tbHeight <= 32 ) | |
| && ( IntraSubPartitionsSplit[ x0 ][ y0 ] = = ISP_NO_SPLIT ) | |
| && ( !cu_sbt_flag ) ) { | |
| if( sps_transform_skip_enabled_flag && !BdpcmFlag[ x0 ][ y0 ] && | |
| tbWidth <= MaxTsSize && tbHeight <= MaxTsSize ) | |
| transform_skip_flag[ x0 ][ y0 ] | ae(v) |
| if( ( ( CuPredMode[ chType ][ x0 ][ y0 ] = = MODE_INTER && | |
| sps_explicit_mts_inter_enabled_flag ) \| \| | |
| ( CuPredMode[ chType ][ x0 ][ y0 ] = MODE_INTRA && | |
| sps_explicit_mts_intra_enabled_flag ) ) && | |
| ( !transform_skip_flag[ x0 ][ y0 ] ) ) | |
| tu_mts_idx[ x0 ][ y0 ] | ae(v) |
| } | |
| if( tu_cbf_luma[ x0 ][ y0 ] ) { | |
| if( !transform_skip_flag[ x0 ][ y0 ] ) | |
| residual_coding( x0, y0, Log2( tbWidth ), Log2( tbHeight ), 0 ) | |
| else | |
| residual_ts_coding( x0, y0, Log2( tbWidth ), Log2( tbHeight), 0 ) | |
| } | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] && | |
| !( tu_cbf_cb[ x0 ][ y0 ] && tu_joint_cbcr_residual_flag[ x0 ][ y0 ] )) { | |
| residual_coding( xC, yC, Log2( wC ), Log2( hC ), 2 ) | |
| } | |
| } | |
| if( IntraSubPartitionsSplitType != ISP_NO_SPLIT && | |
| treeType = = SINGLE_TREE && subTuIndex = = NumIntraSubPartitions – 1 ) | |
| ) | |
| xC = CbPosX[ chType ][ x0 ][ y0 ] | |
| yC = CbPosY[ chType ][ x0 ][ y0 ] | |
| wC = CbWidth[ chType ][ x0 ][ y0 ] / SubWidthC | |
| hC = CbHeight[ chType ][ x0 ][ y0 ] / SubHeightC | |
| } else | |
| xC = x0 | |
| yC = y0 | |
| wC = tbWidth / SubWidthC | |
| hC = tbHeight / SubHeightC | |
| } | |
| if( ( CbWidth[ chType ][ x0 ][ y0 ] > 64 \| \| CbHeight[ chType ][ x0 ][ y0 ] > 64 \| | |
| \| | |
| tu_cbf_luma[ x0 ][ y0 ] \| \| tu_cbf_cb[ x0 ][ y0 ] \| \| tu_cbf_cr[ x0 ][ y0 ] ) | |
| && | |
| treeType != DUAL_TREE_CHROMA ) { | |
| if( cu_qp_delta_enabled_flag && !IsCuQpDeltaCoded ) { | |
| cu_qp_delta_abs | ae(v) |
| if( cu_qp_delta_abs ) | |
| cu_qp_delta_sign_flag | ae(v) |
| } | |
| } | |
| if( ( tu_cbf_cb[ x0 ][ y0 ] \| \| tu_cbf_cr[ x0 ][ y0 ] ) { | |
| if( cu_chroma_qp_offset_enabled_flag && !IsCuChromaQpOffsetCoded) { | |
| cu_chroma_qp_offset_flag | ae(v) |
| if( cu_chroma_qp_offset_flag && chroma_qp_offset_list_len_minus]1 > 0 ) | |
| cu_chroma_qp_offset_idx | ae(v) |
| } | |
| } | |

4.4 Example Modified Deblocking Filter

8.8.3.6.1 Decision Process for Luma Block Edges

Inputs to this process are:

a picture sample array recPicture, a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, a variable bS specifying the boundary filtering strength, a variable maxFilterLengthP specifying the max filter length, a variable maxFilterLengthQ specifying the max filter length.

Outputs of this process are:

the variables dE, dEp and dEq containing decisions, the modified filter length variables maxFilterLengthP and maxFilterLengthQ, the variable $t_C$.

The sample values $p_{i,k}$ and $q_{j,k}$ with i=0 . . . maxFilterLengthP, j=0 . . . maxFilterLengthQ and k=0 and 3 are derived as follows:

If edgeType is equal to EDGE_VER, the following applies:

$$q_{j,k} = recPicture_L[xCb+xBl+j][yCb+yBl+k] \qquad (8\text{-}1066)$$

$$p_{i,k} = recPicture_L[xCb+xBl-i-1][yCb+yBl+k] \qquad (8\text{-}1067)$$

Otherwise (edgeType is equal to EDGE_HOR), the following applies:

$$q_{j,k} = recPicture[xCb+xBl+k][yCb+yBl+j] \qquad (8\text{-}1068)$$

$$p_{i,k} = recPicture[xCb+xBl+k][yCb+yBl-i-1] \qquad (8\text{-}1069)$$

The variable qpOffset is derived as follows:

If sps_ladf_enabled_flag is equal to 1, the following applies:

The variable lumaLevel of the reconstructed luma level is derived as follow:

$$lumaLevel=((p_{0,0}+p_{0,3}+q_{0,0}+q_{0,3}) >> 2), \qquad (8\text{-}1070)$$

The variable qpOffset is set equal to sps_ladf_lowest_interval_qp_offset and modified as follows:

```
for(  i  =  0;  i  <  sps_num_ladf_intervals_minus2  +  1;  i++  )  {
    if(       lumaLevel       >          SpsLadfIntervalLowerBound[ i + 1 ]        )
        qpOffset = sps_ladf_qp_offset[ i ]    (8-1071)
    else
        break
}
```

Otherwise, qpOffset is set equal to 0.

The variables $Qp_Q$ and $Qp_P$ are set equal to the $Qp_Y$ values of the {{transform}}[[coding]] units which include the coding blocks containing the sample $q_{0,0}$ and $p_{0,0}$, respectively.

The variable qP is derived as follows:

$$qP=((Qp_Q+Qp_P+1) >> 1)+qpOffset \qquad (8\text{-}1072)$$

The value of the variable $\beta'$ is determined as specified in Table 8-18 based on the quantization parameter Q derived as follows:

$$Q=Clip3(0,63,qP+(slice\_beta\_offset\_div2 << 1)) \qquad (8\text{-}1073)$$

where slice_beta_offset_div2 is the value of the syntax element slice_beta_offset_div2 for the slice that contains sample $q_{0,0}$.

. . .

8.8.3.6.3 Decision Process for Chroma Block Edges

This process is only invoked when ClromaArrayType is not equal to 0.

Inputs to this process are:

a chroma picture sample array recPicture, a chroma location (xCb, yCb) specifying the top-left sample of the current chroma coding block relative to the top-left chroma sample of the current picture, a chroma location (xBl, yBl) specifying the top-left sample of the current chroma block relative to the top-left sample of the current chroma coding block, a variable edgeType specifying whether a vertical (EDGE_VER) or a horizontal (EDGE_HOR) edge is filtered, a variable cIdx specifying the colour component index, a variable cQpPicOffset specifying the picture-level chroma quantization parameter offset, a variable bS specifying the boundary filtering strength, a variable maxFilterLengthCbCr.

Outputs of this process are the modified variable maxFilterLengthCbCr, the variable $t_C$.

The variable maxK is derived as follows:

If edgeType is equal to EDGE_VER, the following applies:

$$maxK=(SubHeightC==1)?3:1 \qquad (8\text{-}1124)$$

Otherwise (edgeType is equal to EDGE_HOR), the following applies:

$$maxK=(SubWidthC==1)?3:1 \qquad (8\text{-}1125)$$

The values $p_i$ and $q_i$ with i=0 . . . maxFilterLengthCbCr and k=0 . . . maxK are derived as follows:

If edgeType is equal to EDGE_VER, the following applies:

$$q_{i,k} = recPicture[xCb+xBl+i][yCb+yBl+k] \qquad (8\text{-}1126)$$

$$p_{i,k} = recPicture[xCb+xBl-i-1][yCb+yBl+k] \qquad (8\text{-}1127)$$

$$subSampleC=SubHeightC \qquad (8\text{-}1128)$$

Otherwise (edgeType is equal to EDGE_HOR), the following applies:

$$q_{i,k} = recPicture[xCb+xBl+k][yCb+yBl+i] \qquad (8\text{-}1129)$$

$$p_{i,k} = recPicture[xCb+xBl+k][yCb+yBl-i-1] \qquad (8\text{-}1130)$$

$$subSampleC=SubWidthC \qquad (8\text{-}1131)$$

The variables $Qp_Q$ and $Qp_P$ are set equal to the $Qp_Y$ values of the {{transform}}[[coding]] units which include the coding blocks containing the sample $q_{0,0}$ and $p_{0,0}$, respectively.

The variable $Qp_C$ is derived as follows:

$$qPi=Clip3(0,63,((Qp_Q+Qp_P+1)>>1)+cQpPicOffset) \quad (8\text{-}1132)$$

$$Qp_C=ChromaQpTable[cIdx-1][qPi] \quad (8\text{-}1133)$$

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice cr_qp_offset nor (when cu_chroma_qp_offset_enabled_flag is equal to 1) for the value of $CuQpOffset_{Cb}$, $CuQpOffset_{Cr}$, or $CuQpOffset_{CbCr}$.

The value of the variable β' is determined as specified in Table 8-18 based on the quantization parameter Q derived as follows:

$$Q=Clip3(0,63,Qp_C+(slice\_beta\_offset\_div2<<1)) \quad (8\text{-}1134)$$

where slice_beta_offset_div2 is the value of the syntax element slice_beta_offset_div2 for the slice that contains sample $q_{0,0}$.

Figure 3:
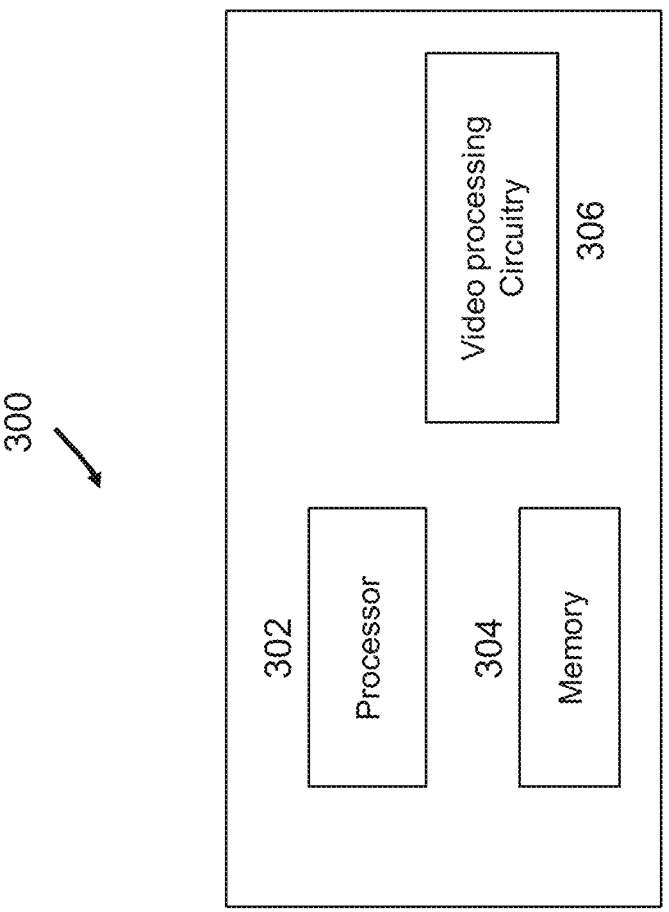
FIG. 3 is a block diagram of an example implementation of a hardware platform for video processing.

FIG. 3 is a block diagram of a video processing apparatus 300. The apparatus 300 may be used to implement one or more of the methods described herein. The apparatus 300 may be embodied in a smartphone, tablet, computer, Internet of Things (IoT) receiver, and so on. The apparatus 300 may include one or more processors 302, one or more memories 304 and video processing hardware 306. The processor(s) 302 may be configured to implement one or more methods described in the present disclosure. The memory (memories) 304 may be used for storing data and code used for implementing the methods and techniques described herein. The video processing hardware 306 may be used to implement, in hardware circuitry, some techniques described in the present disclosure. In some embodiments, the hardware 306 may be at least partly within the processor 302, e.g., a graphics co-processor.

The following solutions may be implemented as preferred solutions in some embodiments.

The following solutions may be implemented together with additional techniques described in items listed in the previous section (e.g., item 1).

Figure 4:
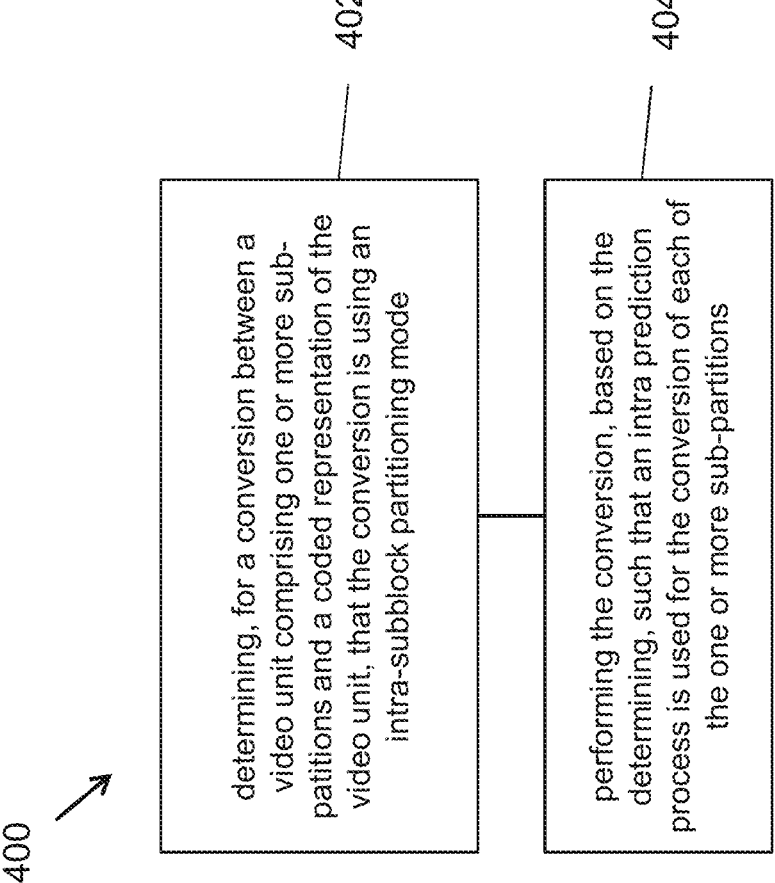
FIG. 4 is a flowchart for an example method of video processing.

1. A method of video processing (e.g., method 400 depicted in FIG. 4), comprising: determining (402), for a conversion between a video unit comprising one or more sub-partitions and a coded representation of the video unit, that the conversion is using an intra-sub-block partitioning mode; and performing (404) the conversion, based on the determining, such that an intra prediction process is used for the conversion of each of the one or more sub-partitions.

2. The method of solution 1, wherein the intra prediction process includes updating an x partition index variable and a y partition index variable at an end of the intra prediction process.

The following solutions may be implemented together with additional techniques described in items listed in the previous section (e.g., item 2).

3. A method of video processing, comprising: determining, based on an applicability of a coding tool and/or a size of a prediction unit of a video block and without using a coding unit size of the video block, whether a wide-angle intra prediction mapping is to be used during a conversion between the video block and a coded representation of the video block; and performing the conversion based on an outcome of the determining.

4. The method of solution 3, wherein the determining is performed such that the wide-angle intra prediction mapping is disabled due to the coding tool being a specific coding tool.

5. The method of solution 3, wherein the determining is performed such that the wide-angle intra prediction mapping is an identical mapping due to the coding tool being a specific coding tool.

6. The method of solutions 4-5, wherein the specific coding tool is an intra sub-partitioning tool.

The following solutions may be implemented together with additional techniques described in items listed in the previous section (e.g., item 3).

7. A method of performing video processing, comprising: determining, for a conversion between a video region comprising a coding unit, wherein the coding unit comprises intra sub-block partitions, a delta quantization parameter (delta QP) that is applicable to the conversion of all intra sub-block partitions of the coding unit and a coded representation of the video region; and performing the conversion using the delta QP; wherein the delta QP is signaled for the coding unit in the coded representation.

8. The method of solution 7, wherein the delta QP is signaled with a first transform unit of the video region.

9. The method of solution 7, wherein the delta QP is signaled with a last transform unit of the video region.

10. The method of solution 7, wherein the delta QP is signaled with a transform unit with a pre-defined location within the video region.

The following solutions may be implemented together with additional techniques described in items listed in the previous section (e.g., item 4).

11. A method of video processing, comprising: determining, for a conversion between a video region and a coded representation of the video region, a quantization parameter (QP) used for the conversion of a coding unit (CU) in the video region based on a QP of a transform unit (TU) in the video region; and performing the conversion using the QP of the TU and/or the QP of the CU.

12. The method of solution 11, wherein the QP for the CU is determined to be equal to the QP of the TU that is a last or a first TU of the video region.

13. The method of any of solutions 11-12, wherein the QP of the CU is determined to be the QP of the TU prior to adding a delta QP to the QP of the TU.

14. The method of any of solutions of 11-13, wherein the performing the conversion further includes: selectively applying a deblocking filter to the video region during the conversion based on the QP of the CU.

The following solutions may be implemented together with additional techniques described in items listed in the previous section (e.g., item 5).

15. A method of video processing, comprising: determining, for a conversion between a video region comprising one or more coding units and one or more transform units, about whether to apply a deblocking filter to an edge a video block for the conversion based on a transform unit to which the edge belongs; and performing the conversion based on the determining.

16. The method of solution 15, further including, using an intra sub-partition mode for the conversion of the video block, and wherein the determining based on the transform unit is performed by checking a quantization parameter of the transform unit.

17. The method of solution 15, wherein due to the video block being larger in size than that of a virtual pipeline data unit or a maximum transform block size and base, the determining includes determining, further based on a quantization parameter of a coding unit to which the edge belongs.

The following solutions may be implemented together with additional techniques described in items listed in the previous section (e.g., item 6).

18. A method of video processing, comprising: determining, for a conversion between a video block and a coded representation of the video block using an intra sub-partitioning mode, whether a transform operation is skipped based on a dimension of a coding block or a prediction block or a transform block; and performing the conversion based on the determining.

19. The method of solution 18, wherein the intra sub-partitioning mode is a vertical intra sub-partitioning mode.

20. The method of solution 18, wherein the intra sub-partitioning mode is a horizontal intra sub-partitioning mode.

The following solutions may be implemented together with additional techniques described in items listed in the previous section (e.g., item 7).

21. The method of any of solutions 1-20, wherein the conversion using the intra sub-partitioning mode includes using 2*W above neighboring samples and 2*H left neighboring samples for the conversion for W×H transform block size.

The following solutions may be implemented together with additional techniques described in items listed in the previous section (e.g., item 8 and 9).

22. A method of video processing, comprising: determining, for a conversion between a video block and a coded representation of the video block, a type of transform to be applied based on whether an intra sub-partitioning mode or a lossless coding mode is used for the conversion; and performing the conversion based on the determining.

23. The method of solution 22, wherein the determining further uses a transform block width in determining the type of transform.

24. The method of any of solutions 22-23, wherein the type of transform is a horizontal transform or a vertical transform.

25. The method of any of solutions 22-24, wherein, in case that the lossless coding mode is used, the determining the type of transform includes determining to use a 4×4 transform.

26. The method of any of solutions 22-24, wherein, in case that the intra sub-partitioning mode and the lossless coding mode are used, the determining comprises determining the type of transform to be a P×Q transform, wherein P and/or Q are integer numbers that depend on a size of the video block.

The following solutions may be implemented together with additional techniques described in items listed in the previous section (e.g., item 10).

27. A video processing method, comprising: performing a conversion between a video block and a coded representation of the video block on a rule of exclusivity due to which either a lossless coding mode is used for the conversion or an intra sub-partitioning mode is used for the conversion, wherein the coded representation includes an indication that either the lossless coding mode is used or the intra sub-partitioning mode is used.

28. The method of solution 27, wherein the rule of exclusivity further defines that the lossless coding mode is disabled due to the video block belonging to a coding unit or a coding tree unit or a virtual pipeline data unit or a slice or a picture or a sequence level bypass enabled flag mode being enabled for the video block.

The following solutions may be implemented together with additional techniques described in items listed in the previous section (e.g., item 11).

29. The method of any of solutions 1-28, wherein a given transform unit that is split due to partitioning in the intra sub-partitioning tool is disallowed to have all-zero coefficients.

30. The method of any of solutions 1 to 29, wherein the conversion comprises encoding the video into the coded representation.

31. The method of any of solutions 1 to 29, wherein the conversion comprises decoding the coded representation to generate pixel values of the video.

32. A video decoding apparatus comprising a processor configured to implement a method recited in one or more of solutions 1 to 31.

33. A video encoding apparatus comprising a processor configured to implement a method recited in one or more of solutions 1 to 31.

34. A computer program product having computer code stored thereon, the code, when executed by a processor, causes the processor to implement a method recited in any of solutions 1 to 31.

35. A method, apparatus or system described in the present disclosure.

In the above solutions, the performing the conversion includes using the results of previous decision step during the encoding or decoding operation to arrive at the conversion results.

Figure 5:
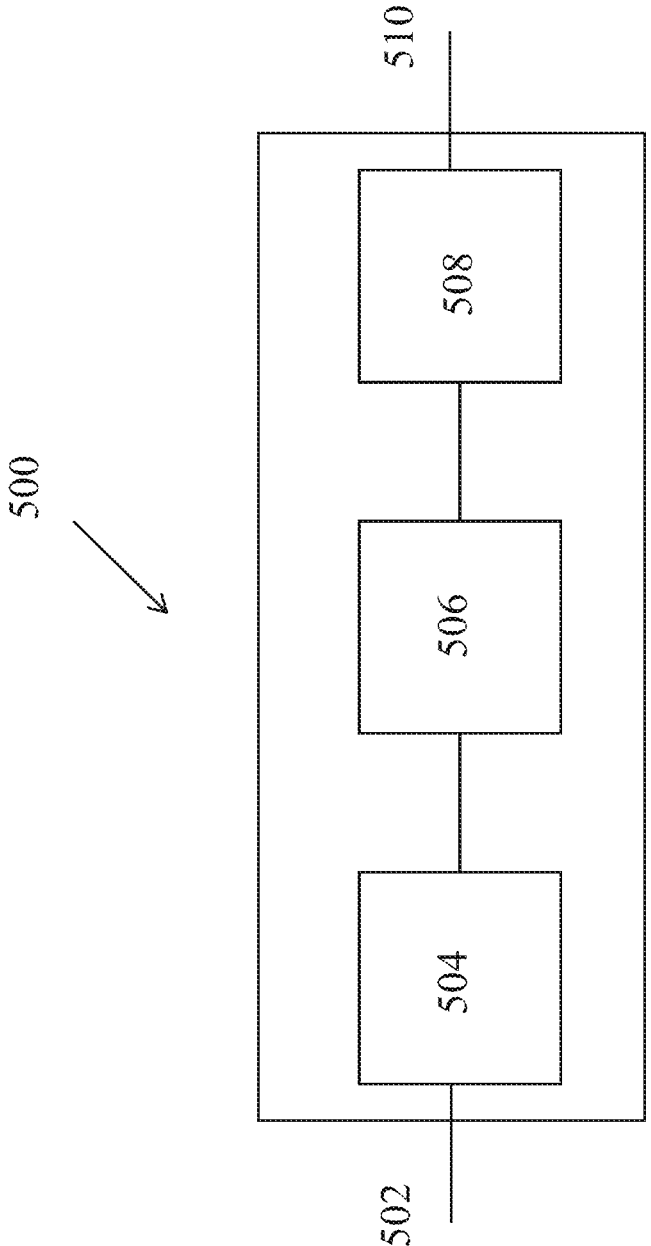
FIG. 5 is a block diagram of an example video processing system in which disclosed techniques may be implemented.

FIG. 5 is a block diagram showing an example video processing system 500 in which various techniques disclosed herein may be implemented. Various implementations may include some or all of the components of the system 500. The system 500 may include input 502 for receiving video content. The video content may be received in a raw or uncompressed format, e.g., 8 or 10 bit multi-component pixel values, or may be in a compressed or encoded format. The input 502 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 500 may include a coding component 504 that may implement the various coding or encoding methods described in the present disclosure. The coding component 504 may reduce the average bitrate of video from the input 502 to the output of the coding component 504 to produce a coded representation of the video. The coding techniques are therefore sometimes called video compression or video transcoding techniques. The output of the coding component 504 may be either stored, or transmitted via a communication connected, as represented by the component 506. The stored or communicated bitstream (or coded) representation of the video received at the input 502 may be used by the component 508 for generating pixel values or displayable video that is sent to a display interface 510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 6:
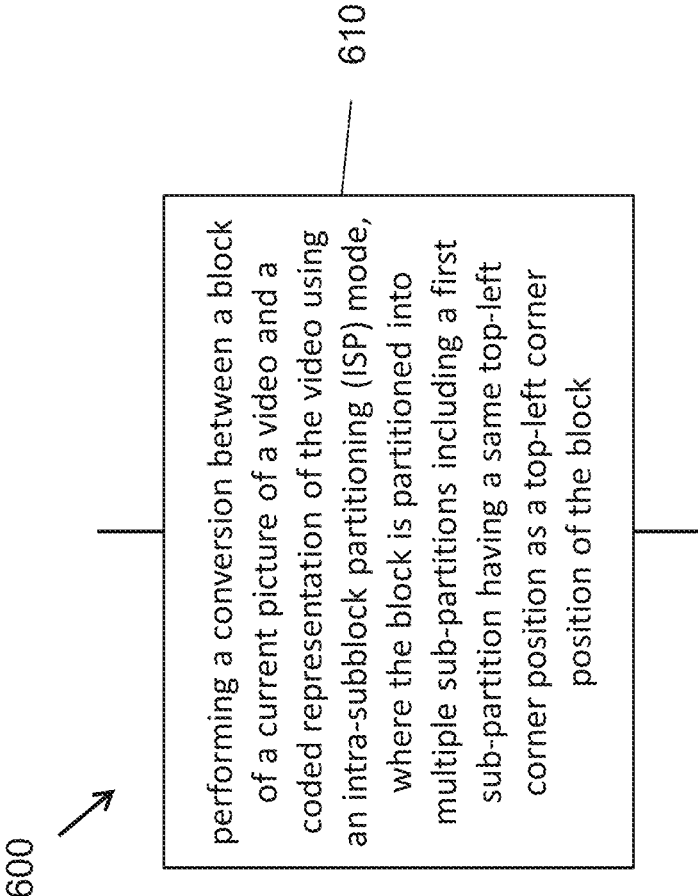
FIG. 6 is a flowchart representation of a method for video processing in accordance with the present technology.

FIG. 6 is a flowchart representation of a method 600 for video processing in accordance with the present technology. The method 600 includes, at operation 610, performing a conversion between a block of a current picture of a video and a coded representation of the video using an intra-subblock partitioning (ISP) mode. A prediction is determined for each sub-partition using an intra-prediction process based on samples in the current picture using the ISP mode. The block is partitioned into multiple sub-partitions including a first sub-partition having a same top-left corner position as a top-left corner position of the block. In some embodiments, an x partition index variable and a y partition index variable are updated after the reconstruction process is invoked for one sub-partition.

FIG. 7 is a flowchart representation of a method 700 for video processing in accordance with the present technology. The method 700 includes, at operation 710, determining, for a conversion between a block of a video and a coded representation of the video, whether a wide-angle intra prediction mode mapping is enabled based on a rule. The wide-angle prediction mode is a mode in which a reference sample and a sample to be predicted form an obtuse angle with respect to a top-left direction. The rule specifies to use a dimension of a prediction unit for the determining in case that a coding tool is enabled for the conversion of the block. The method 700 also includes, at operation 720, performing the conversion based on the determining.

In some embodiments, the wide-angle intra prediction mode mapping is not to be used in case the coding tool is enabled for the conversion of the block. In some embodiments, the wide-angle intra prediction mapping is an identical mapping in case the coding tool is enabled for the conversion of the block. In some embodiments, the coding tool includes an intra-subblock partitioning (ISP) mode in which a prediction is determined for each sub-partition using an intra-prediction process based on samples in a current picture FIG. 8 is a flowchart representation of a method 800 for video processing in accordance with the present technology. The method 800 includes, at operation 810, performing a conversion between a coding unit of a video region of a video and a coded representation of the video. The coding unit is partitioned into one or more partitions, and the coding unit is coded in the coded representation using a quantized residual signal obtained by an intra prediction process of each of the one or more partitions. The coded representation includes a syntax element indicative of a quantization parameter used for quantizing. The syntax element is included in the coded representation at most once for the coding unit, and the syntax element indicates a difference in value of the quantization parameter and another quantization value based on previously processed coding units of the video.

In some embodiments, the difference in value of the quantization parameter is omitted in the coded representation in case an intra-subblock partitioning process based on the one or more partitions is used. In some embodiments, the difference in value of the quantization parameter is signaled with a first transform unit of the video region. In some embodiments, the difference in value of the quantization parameter is signaled with a last transform unit of the video region.

In some embodiments, the difference in value of the quantization parameter is signaled with a specific transform unit regardless of whether the specific transform unit includes non-zero coefficients. In some embodiments, the difference in value of the quantization parameter is signaled with a specific transform unit in case the specific transform unit includes non-zero coefficients. In some embodiments, the difference in value of the quantization parameter is defaulted to be 0 in case the specific transform unit includes zero coefficients only. In some embodiments, the specific transform unit comprises a first or a last transform unit of the video region.

Figure 9:
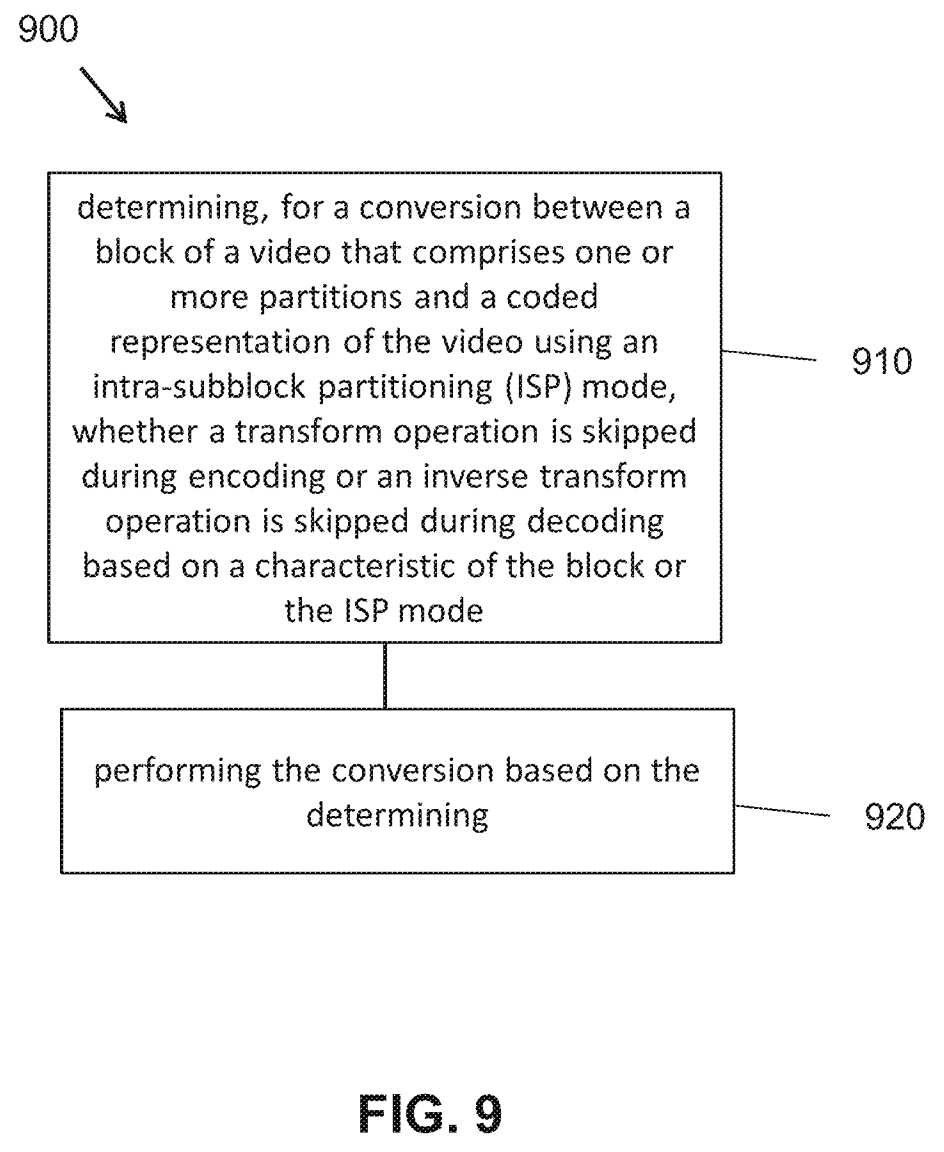

FIG. 9 is a flowchart representation of a method 900 for video processing in accordance with the present technology. The method 900 includes, at operation 910, determining, for a conversion between a block of a video that comprises one or more partitions and a coded representation of the video using an intra-subblock partitioning (ISP) mode, whether a transform operation is skipped during encoding or an inverse transform operation is skipped during decoding based on a characteristic of the block or the ISP mode. Using the ISP mode, a prediction is determined for each sub-partition using an intra-prediction process based on samples in a current picture. The method 900 also includes, at operation 920, performing the conversion based on the determining.

In some embodiments, the characteristic of the block comprises a dimension of the block. In some embodiments, the block comprises a coding block, a prediction block, or a transform block. In some embodiments, the characteristic of the ISP mode comprises a direction in which the ISP is applied, the direction comprising a vertical direction or a horizontal direction. In some embodiments, same reference samples are used for the conversion regardless of whether the ISP mode is used. In some embodiments, the block comprises a transform block having a width W and a height H, and 2×W neighboring samples above the block and 2×H neighboring samples left to the block are used for the conversion of the block.

Figure 10:
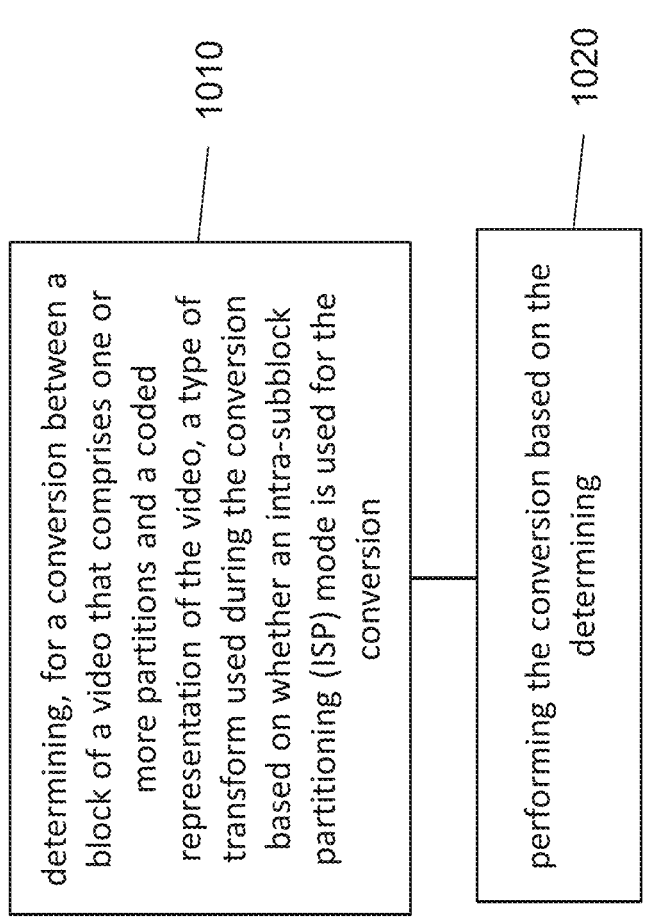
FIG. 10 is a flowchart representation of another method for video processing in accordance with the present technology.

FIG. 10 is a flowchart representation of a method 1000 for video processing in accordance with the present technology. The method 1000 includes, at operation 1010, determining, for a conversion between a block of a video that comprises one or more partitions and a coded representation of the video, a type of transform used during the conversion based on whether an intra-subblock partitioning (ISP) mode is used for the conversion. Using the ISP mode, a prediction is determined for each sub-partition using an intra-prediction process based on samples in a current picture. The conversion comprises, applying a transform prior to encoding in the coded representation during encoding or applying an inverse transform of the transform to parsed coefficient values from the coded representation prior to reconstructing sample values of the block. The method 1000 also includes, at operation 1020, performing the conversion based on the determining.

In some embodiments, the type of transform comprises a horizontal transform or a vertical transform. In some embodiments, the determining is further based on whether a transform block width is larger than a threshold K, K being an integer that is 1 or 2. In some embodiments, the determining is further based on whether a transform block height is larger than a threshold K, K being an integer that is 1 or 2.

Figure 11:
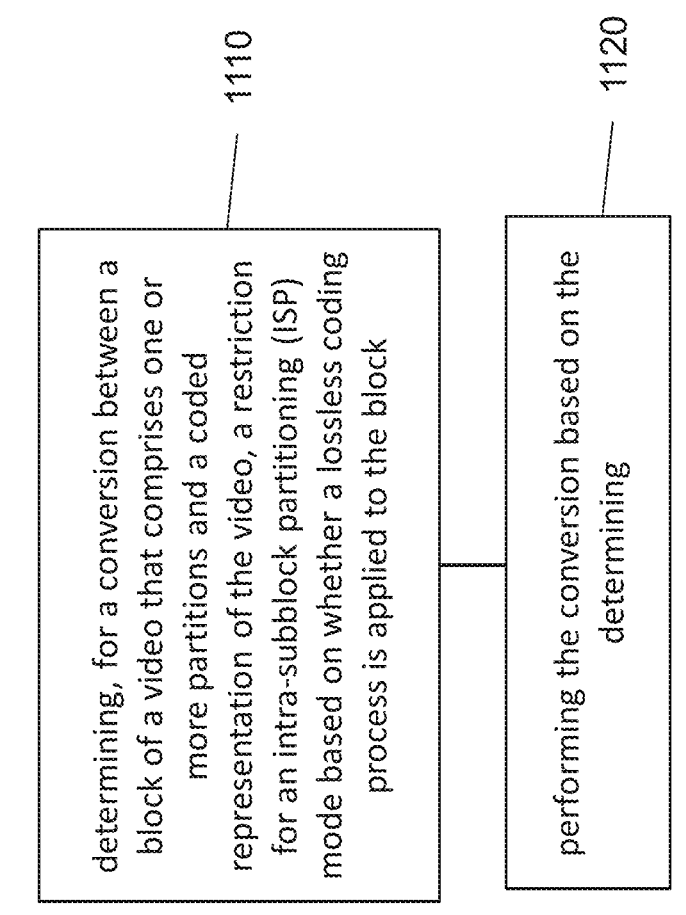
FIG. 11 is a flowchart representation of another method for video processing in accordance with the present technology.

FIG. 11 is a flowchart representation of a method 1100 for video processing in accordance with the present technology. The method 1100 includes, at operation 1110, determining, for a conversion between a block of a video that comprises one or more partitions and a coded representation of the video, a restriction for an intra-subblock partitioning (ISP) mode based on whether a lossless coding process is applied to the block. A prediction is determined for each sub-partition using an intra-prediction process based on samples in a current picture using the ISP mode. The method 1100 also includes, at operation 1120, performing the conversion based on the determining.

In some embodiments, in case the lossless coding mode applied to the block, the restriction comprises enforcing a transform size limitation for the block that is coded using the ISP mode. In some embodiments, the transform size limitation comprises a 4×4 transform size. In some embodiments, the block has a dimension of M×N comprises four partitions, each having a dimension of (M/4)×N, and each partition is split to 4×4 transform blocks for performing a transform operation and/or a quantization operation. In some embodiments, in case the lossless coding mode applied to the block, the restriction comprises enforcing a coding block size limitation for the block that is coded using the ISP mode. In some embodiments, the block comprises one or more partitions, and a width of each of the one or more partitions is equal to or greater than 4. In some embodiments, the block comprises one or more partitions, and a height of each of the one or more partitions is equal to or greater than 4.

In some embodiments, in case the lossless coding mode applied to the block, the restriction specifies that signaling of a syntax element in the coded representation is dependent on a dimension of an individual partition. The syntax element specifies a direction in which the block is split into the one or more partitions. In some embodiments, the direction specified by the syntax element is disallowed in case a width or a height of the individual partition is smaller than 4. In some embodiments, the signaling of the syntax element is omitted in the coded representation, and a value of the syntax element is derived based on a shape of the block.

In some embodiments, the restriction specifies that the ISP mode is disabled in case the lossless coding process is applied to the block. In some embodiments, the restriction comprises that the ISP mode is enabled in case the lossless coding process is not applied to the block. In some embodiments, in case a trans-quant bypass enabled syntax flag in the coded representation indicates that the lossless coding process is enabled at a video unit level, the ISP mode is disabled for the video unit. The video unit comprises a coding unit, a coding tree unit, a virtual pipeline data unit, a slice, a picture, or a sequence. In some embodiments, none of transform units determined using the ISP mode comprises non-zero coefficients. In some embodiments, all transform units determined using the ISP mode comprise only zero coefficients. In some embodiments, syntax flags for the all transform units indicating non-zoro transform coefficients are signaled in the coded representation.

Figure 12:
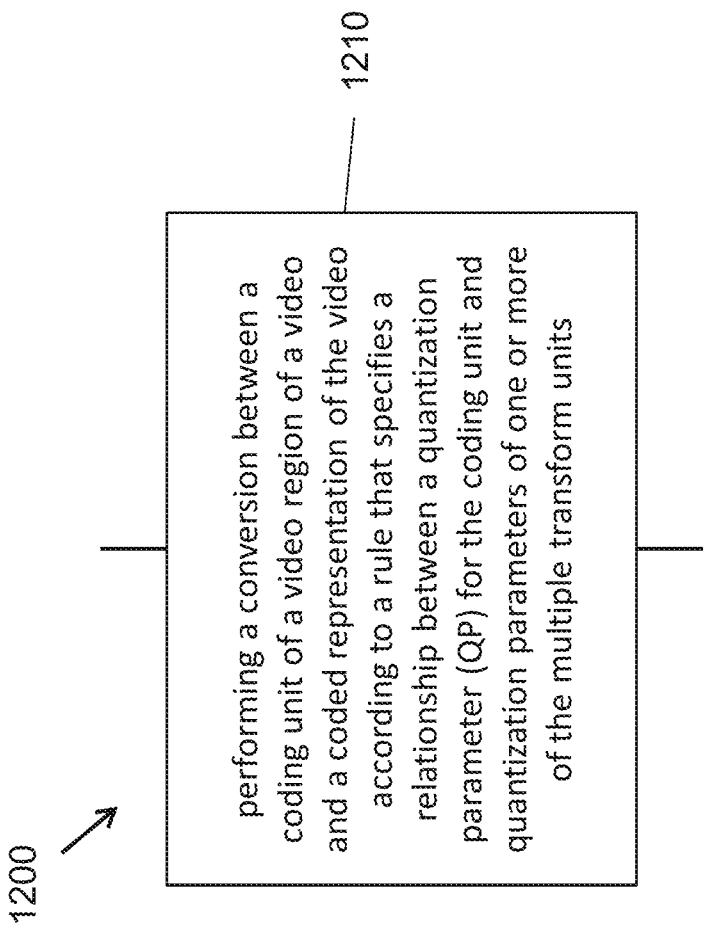
FIG. 12 is a flowchart representation of another method for video processing in accordance with the present technology.

FIG. 12 is a flowchart representation of a method 1200 for video processing in accordance with the present technology. The method 1200 includes, at operation 1210, performing a conversion between a coding unit of a video region of a video and a coded representation of the video according to a rule. The coding unit is divided into multiple transform units. The rule specifies a relationship between a quantization parameter (QP) for the coding unit and quantization parameters of one or more of the multiple transform units.

In some embodiments, the QP of the coding unit is equal to a QP of a last transform unit or a first transform unit of the coding unit. In some embodiments, the QP of the coding unit is determined to be a QP of at least one transform unit within the coding unit prior to being added by a difference in value of the quantization parameter and another quantization value based on previously processed coding units of the video. In some embodiments, the QP of the coding unit is derived using a function of QPs of the one or more transform unit with at least one delta QP applied, the delta QP being a difference in value of the quantization parameter and another quantization value based on previously processed coding units of the video. In some embodiments, performing the conversion further comprises selectively applying a deblocking filter to the coding unit during the conversion based on the QP of the coding unit.

Figure 13:
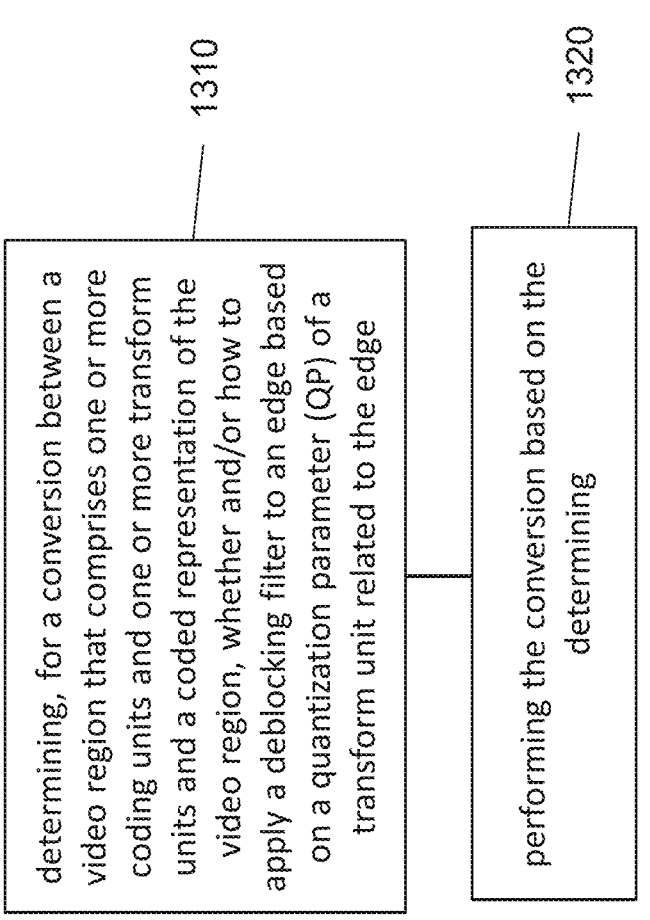
FIG. 13 is a flowchart representation of yet another method for video processing in accordance with the present technology.

FIG. 13 is a flowchart representation of a method 1300 for video processing in accordance with the present technology. The method 1300 includes, at operation 1310, determining, for a conversion between a video region that comprises one or more coding units and one or more transform units and a coded representation of the video region, whether and/or how to apply a deblocking filter to an edge based on a quantization parameter (QP) of a transform unit related to the edge. The method 1300 also includes, at operation 1320, performing the conversion based on the determining.

In some embodiments, in case an intra-subblock partitioning process is used for the conversion of the video region, the QP for the transform unit is used. In some embodiments, in case the video region is larger in size than that of a virtual pipeline data unit or a maximum transform block size, the QP for the transform unit is used instead of a QP of a coding unit.

In some embodiments, the conversion comprises encoding the video into the coded representation. In some embodiments, the conversion comprises decoding the coded representation to generate pixel values of the video.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing video data, comprising:

determining, for a conversion between a current video block of a video and a bitstream of the video, whether a partitioning mode is used for the current video block;

partitioning, in case that the partitioning mode is used for the current video block, the current video block into multiple sub-regions; and performing the conversion based on the multiple sub-regions, wherein the multiple sub-regions share a same intra prediction mode, and the multiple sub-regions include a first sub-region having a same top-left corner position as that of the current video block, wherein in case that the partitioning mode is used for the current video block, different syntax elements are conditionally included in the bitstream for different sub-regions respectively, wherein each of the different syntax elements indicates an absolute value of a difference between a quantization parameter of a corresponding sub-region and a prediction of the quantization parameter, wherein each of the different syntax elements is included in the bitstream for the corresponding sub-region when a set of conditions are met, wherein the set of conditions comprise that a tree type of the current video block is not equal to DUAL_TREE_CHROMA, wherein in case that the partitioning mode is used for the current video block and the current video block is a luma transform block, how a wide-angle intra prediction mode for the multiple sub-regions is applied is based on a value derived from a maximum number of a width of each sub-region and 4, and wherein the wide-angle intra prediction mode is a mode in which a reference sample and a sample to be predicted form an obtuse angle with respect to a top-left direction.

2. The method of claim 1, wherein in case that the partitioning mode is used for the current video block and the current video block is the luma transform block, a variable indicating a ratio of a width to a height is derived based on a width of the current video block and a height of the current video block, wherein the variable is used to derive an intra prediction mode in a wide-angle intra prediction mode mapping process for each of the multiple sub-regions.

3. The method of claim 2, wherein in case that the partitioning mode is not used for the current video block, the variable is derived based on the width of the current video block and the height of the current video block.

4. The method of claim 1, wherein in case that the partitioning mode is used for the current video block, each of the different syntax elements is included in the bitstream for the corresponding sub-region containing non-zero coefficients.

5. The method of claim 1, wherein in case that the partitioning mode is used for the current video block, the partitioning is dependent on dimensions of the current video block.

6. The method of claim 5, wherein a partitioning that causes a width or a height of a sub-region to be smaller than a predefined value is disallowed.

7. The method of claim 5, wherein in case that the current video block has a size of M×2M, a partition of the current video block is inferred to be different from a partition of a video block with a size different from M×2M, and wherein M is a predefined integer.

8. The method of claim 1, wherein the conversion includes encoding the current video block into the bitstream.

9. The method of claim 1, wherein the conversion includes decoding the current video block from the bitstream.

10. An apparatus for processing video data comprising a processor and a non-transitory memory with instructions thereon, wherein the instructions upon execution by the processor, cause the processor to:

determine, for a conversion between a current video block of a video and a bitstream of the video, whether a partitioning mode is used for the current video block;

partition, in case that the partitioning mode is used for the current video block, the current video block into multiple sub-regions; and perform the conversion based on the multiple sub-regions, wherein the multiple sub-regions share a same intra prediction mode, and the multiple sub-regions include a first sub-region having a same top-left corner position as that of the current video block, wherein in case that the partitioning mode is used for the current video block, different syntax elements are conditionally included in the bitstream for different sub-regions respectively, wherein each of the different syntax elements indicates an absolute value of a difference between a quantization parameter of a corresponding sub-region and a prediction of the quantization parameter, wherein each of the different syntax elements is included in the bitstream for the corresponding sub-region when a set of conditions are met, wherein the set of conditions comprise that a tree type of the current video block is not equal to DUAL_TREE_CHROMA, wherein in case that the partitioning mode is used for the current video block and the current video block is a luma transform block, how a wide-angle intra prediction mode for the multiple sub-regions is applied is based on a value derived from a maximum number of a width of each sub-region and 4, and wherein the wide-angle intra prediction mode is a mode in which a reference sample and a sample to be predicted form an obtuse angle with respect to a top-left direction.

11. The apparatus of claim 10, wherein in case that the partitioning mode is used for the current video block and the current video block is the luma transform block, a variable indicating a ratio of a width to a height is derived based on a width of the current video block and a height of the current video block, wherein the variable is used to derive an intra prediction mode in a wide-angle intra prediction mode mapping process for each of the multiple sub-regions.

12. The apparatus of claim 11, wherein in case that the partitioning mode is not used for the current video block, the variable is derived based on the width of the current video block and the height of the current video block.

13. The apparatus of claim 10, wherein in case that the partitioning mode is used for the current video block, each of the different syntax elements is included in the bitstream for the corresponding sub-region containing non-zero coefficients.

14. The apparatus of claim 10, wherein in case that the partitioning mode is used for the current video block, the partitioning is dependent on dimensions of the current video block.

15. The apparatus of claim 14, wherein a partitioning that causes a width or a height of a sub-region to be smaller than a predefined value is disallowed.

16. The apparatus of claim 14, wherein in case that the current video block has a size of M×2M, a partition of the current video block is inferred to be different from a partition of a video block with a size different from M×2M, and wherein M is a predefined integer.

17. A non-transitory computer-readable storage medium storing instructions that cause a processor to:

determine, for a conversion between a current video block of a video and a bitstream of the video, whether a partitioning mode is used for the current video block;

partition, in case that the partitioning mode is used for the current video block, the current video block into multiple sub-regions; and perform the conversion based on the multiple sub-regions, wherein the multiple sub-regions share a same intra prediction mode, and the multiple sub-regions include a first sub-region having a same top-left corner position as that of the current video block, wherein in case that the partitioning mode is used for the current video block, different syntax elements are conditionally included in the bitstream for different sub-regions respectively, wherein each of the different syntax elements indicates an absolute value of a difference between a quantization parameter of a corresponding sub-region and a prediction of the quantization parameter, wherein each of the different syntax elements is included in the bitstream for the corresponding sub-region when a set of conditions are met, wherein the set of conditions comprise that a tree type of the current video block is not equal to DUAL_TREE_CHROMA, wherein in case that the partitioning mode is used for the current video block and the current video block is a luma transform block, how a wide-angle intra prediction mode for the multiple sub-regions is applied is based on a value derived from a maximum number of a width of each sub-region and 4, and wherein the wide-angle intra prediction mode is a mode in which a reference sample and a sample to be predicted form an obtuse angle with respect to a top-left direction.

18. The non-transitory computer-readable storage medium of claim 17, wherein in case that the partitioning mode is used for the current video block and the current video block is the luma transform block, a variable indicating a ratio of a width to a height is derived based on a width of the current video block and a height of the current video block, wherein the variable is used to derive an intra prediction mode in a wide-angle intra prediction mode mapping process for each of the multiple sub-regions.

19. The non-transitory computer-readable storage medium of claim 18, wherein in case that the partitioning mode is not used for the current video block, the variable is derived based on the width of the current video block and the height of the current video block.

20. A method for storing bitstream of a video, comprising:

determining whether a partitioning mode is used for a current video block of the video;

partitioning, in case that the partitioning mode is used for the current video block, the current video block into multiple sub-regions;

generating the bitstream based on the multiple sub-regions; and storing the bitstream in a non-transitory computer-readable recording medium, wherein the multiple sub-regions share a same intra prediction mode, and the multiple sub-regions include a first sub-region having a same top-left corner position as that of the current video block, wherein in case that the partitioning mode is used for the current video block, different syntax elements are conditionally included in the bitstream for different sub-regions respectively, wherein each of the different syntax elements indicates an absolute value of a difference between a quantization parameter of a corresponding sub-region and a prediction of the quantization parameter, wherein each of the different syntax elements is included in the bitstream for the corresponding sub-region when a set of conditions are met, wherein the set of conditions comprise that a tree type of the current video block is not equal to DUAL_TREE_CHROMA, wherein in case that the partitioning mode is used for the current video block and the current video block is a luma transform block, how a wide-angle intra prediction mode for the multiple sub-regions is applied is based on a value derived from a maximum number of a width of each sub-region and 4, and wherein the wide-angle intra prediction mode is a mode in which a reference sample and a sample to be predicted form an obtuse angle with respect to a top-left direction.

* * * * *